US008208730B2

(12) United States Patent
Tanaka

(10) Patent No.: US 8,208,730 B2
(45) Date of Patent: Jun. 26, 2012

(54) WORD SEARCH USING HANDWRITING RECOGNITION INPUT WITH DICTIONARY-BASED CORRECTION SUGGESTIONS

(75) Inventor: Hiroshi Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 910 days.

(21) Appl. No.: 11/438,256

(22) Filed: May 23, 2006

(65) Prior Publication Data

US 2007/0189613 A1    Aug. 16, 2007

(30) Foreign Application Priority Data

Feb. 16, 2006  (JP) ................................. 2006-039815

(51) Int. Cl.
 *G06K 9/00* (2006.01)
 *G06K 9/72* (2006.01)
 *G06F 17/00* (2006.01)
(52) U.S. Cl. ........ 382/187; 382/229; 382/311; 715/259; 715/268; 715/816
(58) Field of Classification Search .......... 382/185–189, 382/229, 309–311; 715/256–262, 268, 816
See application file for complete search history.

(56) References Cited

U.S. PATENT DOCUMENTS

| | | | | |
|---|---|---|---|---|
| 5,022,081 A * | 6/1991 | Hirose et al. | .................. | 704/235 |
| 5,167,016 A * | 11/1992 | Bagley et al. | ................. | 715/210 |
| 5,191,622 A * | 3/1993 | Shojima et al. | ............... | 382/185 |
| 5,649,027 A * | 7/1997 | Mahajan et al. | .............. | 382/185 |
| 5,734,749 A * | 3/1998 | Yamada et al. | ............... | 382/187 |
| 5,742,705 A * | 4/1998 | Parthasarathy | ............... | 382/185 |
| 5,818,437 A * | 10/1998 | Grover et al. | ................. | 715/811 |
| 5,896,321 A * | 4/1999 | Miller et al. | ............. | 365/189.15 |
| 5,917,941 A * | 6/1999 | Webb et al. | .................... | 382/177 |
| 6,005,973 A * | 12/1999 | Seybold et al. | ............... | 382/187 |

(Continued)

FOREIGN PATENT DOCUMENTS

JP   58-155443 A  *  9/1983

(Continued)

OTHER PUBLICATIONS

Chai, W. (May 2003) "Nokia phone features handwriting input." ZDNet Asia. Retrieved from Internet at http://www.zdnetasia.com/news/communications/0,39044192,39132523,00.htm.*

(Continued)

*Primary Examiner* — Bhavesh Mehta
*Assistant Examiner* — Barry Drennan
(74) *Attorney, Agent, or Firm* — Kratz, Quintos & Hanson, LLP

(57) ABSTRACT

There are provided a word search apparatus, a word search method, and a computer program product. A words dictionary, and a character recognition dictionary for storing coordinate data of a standard character pattern of a handwritten character and a character are used to thereby search for, from the words dictionary, a word including a character corresponding to one or a plurality of character patterns extracted by performing a pattern matching. Only a character string corresponding to one or a plurality of character patterns is extracted from a search result of the words dictionary to generate a part of character string. A selection of one part of character string among the generated parts of character strings is received, and only a word including the selected part of character string is extracted from the search result based on the words dictionary, so that the extracted word is displayed.

16 Claims, 24 Drawing Sheets

U.S. PATENT DOCUMENTS

| | | | |
|---|---|---|---|
| 6,307,548 B1 * | 10/2001 | Flinchem et al. | 715/811 |
| 6,307,549 B1 * | 10/2001 | King et al. | 715/810 |
| 6,377,965 B1 * | 4/2002 | Hachamovitch et al. | 715/203 |
| 6,618,697 B1 * | 9/2003 | Kantrowitz et al. | 703/22 |
| 6,801,190 B1 * | 10/2004 | Robinson et al. | 345/173 |
| 6,801,659 B1 * | 10/2004 | O'Dell | 382/185 |
| 7,088,861 B2 * | 8/2006 | van Meurs | 382/185 |
| 7,194,404 B1 * | 3/2007 | Babst et al. | 704/9 |
| 7,319,957 B2 * | 1/2008 | Robinson et al. | 704/252 |
| 2004/0070567 A1 * | 4/2004 | Longe et al. | 345/156 |
| 2004/0223644 A1 * | 11/2004 | van Meurs | 382/185 |
| 2005/0099406 A1 * | 5/2005 | Pettiross et al. | 345/179 |
| 2005/0169527 A1 * | 8/2005 | Longe et al. | 382/177 |
| 2007/0061753 A1 * | 3/2007 | Ng et al. | 715/816 |
| 2008/0025613 A1 * | 1/2008 | Kumar et al. | 382/189 |

FOREIGN PATENT DOCUMENTS

| | | |
|---|---|---|
| JP | 60-97477 | 5/1985 |
| JP | 08-305722 | 11/1996 |
| JP | 8-305722 | 11/1996 |
| JP | 9-73458 | 3/1997 |
| JP | 9-259218 | 10/1997 |
| JP | 09-259218 | 10/1997 |
| JP | 2004-206521 | 7/2004 |
| JP | 2005-301914 | 10/2005 |
| WO | WO 2005/008899 * | 1/2005 |

OTHER PUBLICATIONS

Beijing Dongfanghuiling Technology Co. Ltd. (Mar. 2007) Online Chinese-English Dictionary, retrieved from Internet at www.nciku.com.*

Breen, J.W. (Dec. 2003) "A WWW Japanese Dictionary." Language Teaching at the Crossroads, Monash Asia Institute.*

T. Fukushima, et al.; "On-line Writing Box Free Recognition of Handwritten Text based on Stochastic Models;" *Technical Report of the Institute of Electronics, Information and Communication Engineers PRMU 98-139*; Dec. 1998; pp. 25-30, including Abstract (6 Sheets total.)/Discussed in the specification.

Japanese Office Action dated Aug. 17, 2010, with English translation.

Japanese Office Action dated Jan. 25, 2011, with English translation.

Terumi Fukayama, "Business card software safe comfortable managing technique" Nikkei PC21, Oct. 1, 2005, vol. 10, No. 19, pp. 73-85. (together with partial English translation).

Yasuharu Inami et al. "Postprocessing on OCR" PFU • Technical review, PFU Limited, Feb. 1, 1992, vol. 3, No. 1, pp. 37-45. (together with partial English translation).

* cited by examiner

F I G. 4
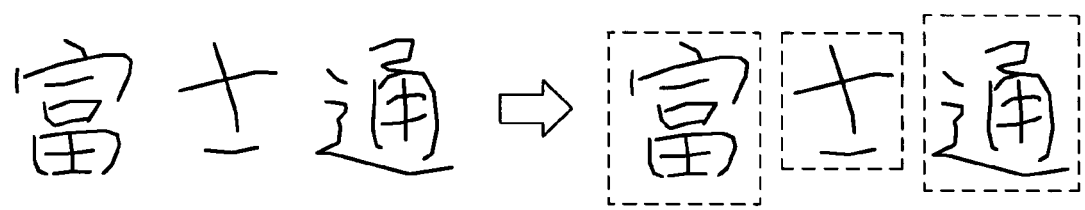

FIG. 6

```
struct RS {
  WORD code;
  int score;
};
BOOL match(struct RS R [M] [D],WORD S [ ],
        int *pSc, int *pSt)
{
  int i, j, k,score, maxScore, st, mLen;
  maxScore = 0;st = -1;
  for (i=0; i<L-M;++i) {
    score = 0; mLen = 0;
    for (j=0; j<m;++j) {
      for (k=0;k<D;++k) {
        if (S [i+j] == R.[j] [k].code)   break;
      }
      if (k == D) {
        score += R [j] [k].score;
        mLen += 1;
      } else {
        score += CONST;
      }
    }
    if (mLen > M / 2) {
      if (score > maxScore) {
        maxScore = score;
        st = i;
      }
    }
  }
  if (maxScore > 0) {
    *pSc = maxScore
    *pSt = st;
    return TRUE;
  }
  return FALSE;
}
```

FIG. 17
CANDIDATE
CHARACTER LIST
| 富士通 |
| 冨山通 |
| けさ通 |
| 書家道 |
| 富士通 |
| 富島遅 |
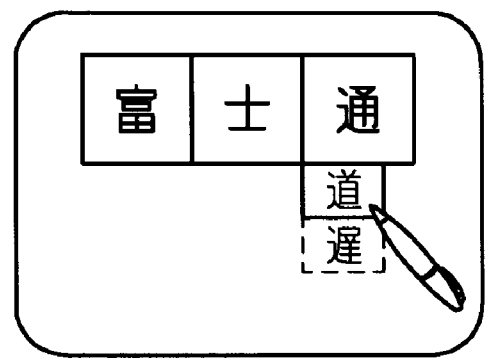

F I G. 2 3
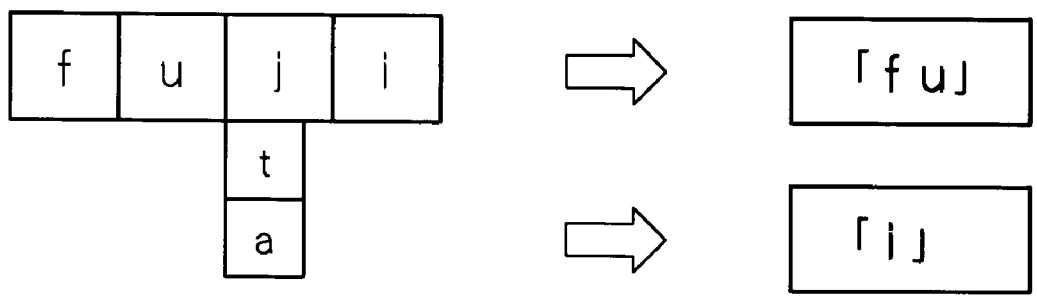

WORD SEARCH USING HANDWRITING RECOGNITION INPUT WITH DICTIONARY-BASED CORRECTION SUGGESTIONS

CROSS-REFERENCE TO RELATED APPLICATIONS

This Nonprovisional application claims priority under 35 U.S.C. Section 119 (a) on Patent Application No. 2006-039815 filed in Japan on Feb. 16, 2006, the entire contents of which are hereby incorporated by reference.

BACKGROUND OF THE INVENTION

The present invention relates to a word search apparatus, a word search method, and a recording medium, which are used for a personal computer (henceforth referred to as PC) having a coordinate input means, such as a pen type tablet, a mouse, or the like, and search for a desired word from a words dictionary to be a searched target using a handwritten character written by a handwriting input, a mouse input, or the like as a search key.

A word search apparatus for searching for a word using a handwritten character as a search key is used for a PC having a coordinate input means, such as a pen type tablet, a mouse, or the like. A conventional word search apparatus using a handwritten character as a search key, by acquiring coordinate values of handwritten data of a character that a user has written, and comparing the acquired coordinate values of the handwritten data with a standard character pattern that is stored in a character recognition dictionary, recognizes the character. It then searches for a desired word based on a result of the recognized character to thereby display a search result on a display unit (refer to Japanese Patent Application Laid-Open No. 9-259218).

FIG. 1 is a block diagram illustrating an example of a conventional handwritten word search, where portions surrounded by the doublet show represent examples of a search result searched based on the character recognition result. In the example of FIG. 1, the character recognition result is displayed not as "富士通", which the user recognizes to be right but as "富さ通" in which the second character is not correct. The user, by using means for correcting an error, can correct the second character to "士" to thereby obtain a word list including the desired word as the search result.

The means for correcting the error is not limited thereto in particular, but for example, while candidate characters (string) of the character recognition result are listed in a table, the user, by pointing out the incorrect character with a pen type tablet, a mouse, or the like, selects a desired character (string) among the candidate characters (strings) listed in the table to thereby correct the error.

In some word search apparatus for searching for a word by using a handwritten character as a search key, not the method of correcting the incorrect character as described above, but a method of searching for a word using a search key including a recognition candidate character is also employed. In this case, if there is a character matching with a recognition candidate character whose priority level is a second level or lower, it is considered that it matches with the search key, and a corresponding word is searched. Meanwhile, even when there is no character that the user desires, in the recognition candidate character, there is also a method of employing, when a character other than that is found, it as a candidate of a word search (refer to Japanese Patent Application Laid-Open No. 8-305722).

BRIEF SUMMARY OF THE INVENTION

The present invention is made in view of the situation described above, and aims at providing a word search apparatus, a word search method, and a recording medium, capable of suppressing the number of searched words to a predetermined limit, without a desired character being missing from a recognition candidate character upon error correction.

In order to achieve the aforementioned object, a word search apparatus in accordance with a first aspect of the present invention includes a word dictionary for storing a plurality of words, a character recognition dictionary for storing coordinate data of a standard character pattern of a handwritten character and a character corresponding to the coordinate data, and a handwritten character receiving means for receiving an input of a handwritten character, in which a word including a character corresponding to one or a plurality of character patterns extracted by performing a pattern matching between the handwritten character received by the handwritten character input means and the character recognition dictionary is searched for from the words dictionary, the word search apparatus further includes a part of character string generating means for extracting only a character string corresponding to one or a plurality of the character patterns from a search result of the words dictionary to generate a part of character string, means for receiving a selection of one part of character string from the generated parts of character strings, means for extracting only a word including the selected a part of character string from the search result based on the words dictionary, and means for displaying the extracted word.

A word search apparatus in accordance with a second aspect of the present invention includes a word dictionary for storing a plurality of words, a character recognition dictionary for storing coordinate data of a standard character pattern of a handwritten character and a character corresponding to the coordinate data, and a handwritten character receiving means for receiving an input of a handwritten character, in which a word including a character corresponding to one or a plurality of character patterns extracted by performing a pattern matching between the handwritten character received by the handwritten character input means and the character recognition dictionary is searched for from the words dictionary, the word search apparatus further includes a part of character string generating means for extracting only a character string corresponding to one or a plurality of the character patterns from a search result of the words dictionary to generate a part of character string, a candidate character extracting means for extracting a candidate character for every character based on the generated a part of character string, means for receiving a selection of one candidate character among the extracted candidate characters, a part of character string reconstructing means for reconstructing the part of character string based on the selected candidate character, means for extracting only a word including the reconstructed part of character string from the search result based on the words dictionary, and means for displaying the extracted word.

The word search apparatus in accordance with a third aspect of the present invention, in the first or the second aspect of the present invention, includes means for counting the number of searched words based on the search result of the words dictionary, and means for determining whether or not the number of counted words is larger than a predetermined value, wherein only when the means determines that the number of counted words is larger than the predetermined value, the character string generating means generates the part of character string, while when the means determines that the number of counted words is not larger than the predetermined value, a selection from the search result of the words dictionary is received.

A word search method in accordance with a fourth aspect of the present invention uses a word dictionary for storing a plurality of words, a character recognition dictionary for storing coordinate data of a standard character pattern of a handwritten character and a character corresponding to the coordinate data, in which an input of a handwritten character is received, and a words including a character corresponding to one or a plurality of character patterns extracted by performing a pattern matching between the received handwritten character and the character recognition dictionary is searched for from the words dictionary, wherein the word search method includes extracting only a character string corresponding to one or a plurality of the character patterns from a search result of the words dictionary to generate a part of character string, receiving a selection of one part of character string among the generated parts of character strings, extracting only a word including the selected a part of character string from the search result based on the words dictionary, and displaying the extracted word.

A word search method in accordance with a fifth aspect of the present invention uses a word dictionary for storing a plurality of words, and a character recognition dictionary for storing coordinate data of a standard character pattern of a handwritten character and a character corresponding to the coordinate data, in which an input of a handwritten character is received, and a words including a character corresponding to one or a plurality of character patterns extracted by performing a pattern matching between the received handwritten character and the character recognition dictionary is searched for from the words dictionary, wherein the word search method includes extracting only a character string corresponding to one or a plurality of the character patterns from a search result of the words dictionary to generate a part of character string, extracting a candidate character for every character based on the generated part of character string, receiving a selection of one candidate character among the extracted candidate characters, reconstructing the part of character string based on the selected candidate character, extracting only a word including the reconstructed part of character string from the search result based on the words dictionary, and displaying the extracted word.

The word search method in accordance with a sixth aspect of the present invention includes, in the fourth or fifth aspect of the present invention, counting the number of searched words based on the search result of the words dictionary, determining whether or not the number of counted words is larger than a predetermined value, and only when it is determined that the number of counted words is larger than the predetermined value, generating the part of character string, while it is determined that the number of counted words is not larger than the predetermined value, receiving a selection from the search result of the words dictionary.

A recording medium in accordance with a seventh aspect of the present invention includes a word dictionary for storing a plurality of words, and a character recognition dictionary for storing coordinate data of a standard character pattern of a handwritten character and a character corresponding to the coordinate data, in which an input of a handwritten character is received, and a words including a character corresponding to one or a plurality of character patterns extracted by performing a pattern matching between the received handwritten character and the character recognition dictionary is searched for from the words dictionary, wherein the computer program product recorded in the recording medium causes the computer to function as a part of character string generating means for extracting only a character string corresponding to one or a plurality of the character patterns from a search result of the words dictionary to generate a part of character string, means for receiving a selection of one part of character string from the generated parts of character strings, means for extracting only a word including the selected a part of character string from the search result based on the words dictionary, and means for displaying the extracted word.

A recording medium in accordance with an eighth aspect of the present invention includes a word dictionary for storing a plurality of words, a character recognition dictionary for storing coordinate data of a standard character pattern of a handwritten character and a character corresponding to the coordinate data, in which an input of a handwritten character is received, and a words including a character corresponding to one or a plurality of character patterns extracted by performing a pattern matching between the received handwritten character and the character recognition dictionary is searched for from the words dictionary, wherein the computer program product recorded in the recording medium causes the computer to function as a part of character string generating means for extracting only a character string corresponding to one or a plurality of the character patterns from a search result of the words dictionary to generate a part of character string, a candidate character extracting means for extracting a candidate character for every character based on the generated a part of character string, means for receiving a selection of one candidate character among the extracted candidate characters, a part of character string reconstructing means for reconstructing the part of character string based on the selected candidate character, means for extracting only a word including the reconstructed a part of character string from the search result based on the words dictionary, and means for displaying the extracted word.

The recording medium in accordance with a ninth aspect of the present invention, in the seventh or eighth aspect of the present invention, causes the computer to function as means for counting the number of searched words based on the search result of the words dictionary, means for determining whether or not the number of counted words is larger than a predetermined value, and only when the means determines that the number of counted words is larger than the predetermined value, means for generating the part of character string by the character string generating means, while when the means determines that the number of counted words is not larger than the predetermined value, for receiving a selection from the search result of the words dictionary.

In the first, fourth, and seventh aspects of the present invention, the word including the character corresponding to one or the plurality of character patterns extracted by performing the pattern matching between the received handwritten character and the character recognition dictionary is searched for from the words dictionary. Only the character string corresponding to one or the plurality of character patterns is extracted from the search result of the words dictionary to generate the part of character string. The selection of one part of character string among the generated parts of character strings is received, only the word including the selected a part of character string is extracted from the search result based on the words dictionary, and the extracted word is displayed. As a result of this, it is possible to limit the part of character string to be key information for searching in the words dictionary, thus allowing a significant reduction in the number of words to be search candidates. Hence, usability of the word search apparatus may be significantly improved.

In the second, fifth, and eighth aspects of the present invention, the word including the character corresponding to one or the plurality of character patterns extracted by performing the pattern matching between the received handwritten character and the character recognition dictionary is searched for from the words dictionary. Only the character string corresponding to one or the plurality of character patterns is extracted from the search result of the words dictionary to generate the part of character string. The candidate character for every character is extracted based on the generated a part of character string, the selection of one candidate character is received among the extracted candidate characters, and the part of character string is reconstructed based on the selected candidate character. Only the word including the reconstructed a part of character string is extracted from the search result based on the words dictionary, and the extracted word is displayed. As a result of this, it is possible to limit the part of character string to be key information for searching in the words dictionary, thus allowing a significant reduction in the number of words to be search candidates. Hence, usability of the word search apparatus may be significantly improved. Moreover, since a desired character is certainly present in the recognition candidate characters upon error correction of a character, the error correction can be performed without inputting the handwritten character again to re-execute the character recognition, thus allowing the word search to be smoothly executed.

In the third, sixth, and ninth aspects of the present invention, the number of searched words is counted based on the search result of the words dictionary, it is determined whether or not the number of counted words is larger than the predetermined value, and only when it is determined that the number of counted words is larger than the predetermined value, the part of character string is generated, while it is determined that the number of counted words is not larger than the predetermined value, the selection from the search result of the words dictionary is received. As a result of this, only when the number of words to be outputted as the search result becomes large, the part of character string can be generated, so that data-processing load may not be increased upon normal word search, thereby making it possible to prevent deterioration of a search response in advance.

According to the first, fourth, and seventh aspects of the present invention, it is possible to limit the part of character string to be key information for searching in the words dictionary, thus allowing a significant reduction in the number of words to be search candidates. Hence, usability of the word search apparatus may be significantly improved.

According to the second, fifth, and eighth aspects of the present invention, it is possible to limit the part of character string to be key information for searching in the words dictionary, thus allowing a significant reduction in the number of words to be search candidates. Hence, usability of the word search apparatus may be significantly improved. Moreover, since the desired character is certainly present in the recognition candidate characters upon error correction of characters, the error correction can be performed without inputting the handwritten character again to re-execute the character recognition, thus allowing the word search to be smoothly executed.

According to the third, sixth, and ninth aspects of the present invention, only when the number of words to be outputted as the search result becomes large, the part of character string can be generated, data-processing load may not be increased upon normal word search, thereby making it possible to prevent deterioration of a search response in advance.

The above and further objects and features of the invention will more fully be apparent from the following detailed description with accompanying drawings.

BRIEF DESCRIPTION OF THE SEVERAL VIEWS OF THE DRAWINGS

FIG. 4 is a diagram illustrating an example of a cut-out of a handwritten character in the case of an input without frame;

FIG. 6 is a chart illustrating a specific example of a program product for matching the recognition candidate character with the word character string;

FIG. 17 is a diagram illustrating an example of a screen display upon correcting a candidate character;

FIG. 23 is a diagram illustrating an example of a priority character string when the handwritten character is the alphabetic word.

DETAILED DESCRIPTION OF THE INVENTION

In the aforementioned conventional word search apparatus for searching for a word by using a handwritten character as a search key, when an error arises in a character recognition, it is necessity for a user to correct the error, or to search for a desired word including a word having been searched by using a recognition candidate character whose priority level is the second level or less as a search key. In the former case, it is necessary to select a desired character from the recognition candidate characters, so that there has been a problem that the error correction could not be performed when the desired character has not been present in the recognition candidate characters. In this case, the user needs to input a handwritten character again to re-execute the character recognition, thus making the operation of the error correction complicated. Particularly, when the user writes the handwritten character in a running style, the possibility that the desired character may not be included in the recognition candidate characters is high, thereby making it difficult to smoothly execute the word search.

Meanwhile, in the case of including the word having been searched for by including the recognition candidate character whose priority level is the second level or less as the search key, there has been a problem that the number of words of a search result has been significantly increased. For example, when the desired character is missing from the recognition candidate characters, the number of searched words further increases, and the number of words of the search result also increases, so that the operation to select the desired word becomes more complicated, thus resulting in a significant drop in usability of the word search apparatus.

The present invention is made in view of the situation described above, and aims at providing the word search apparatus, the word search method, and the recording medium, capable of suppressing the number of searched words to a predetermined limit without the desired character being missing from the recognition candidate character upon error correction, where the object of the present invention is realized by means of embodiments described hereinafter.

First Embodiment

Figure 1:
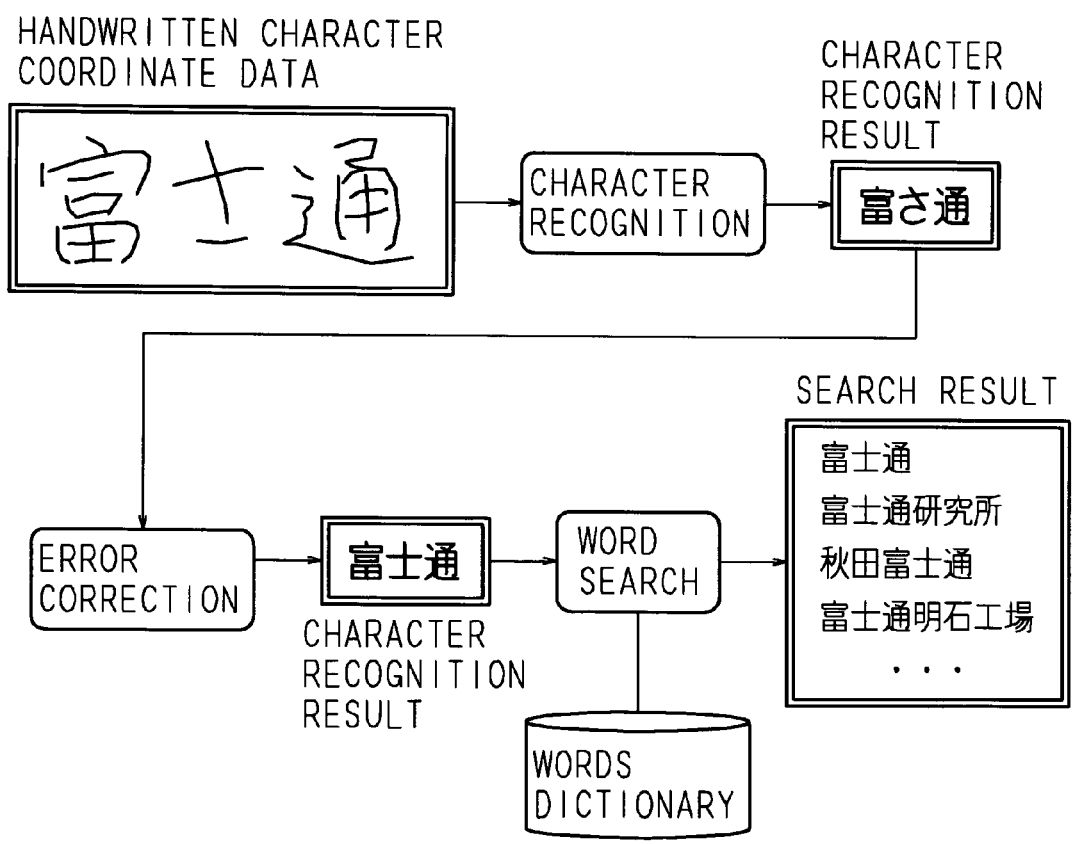
FIG. 1 is a diagram illustrating an example of a conventional handwritten word search.
Figure 2:
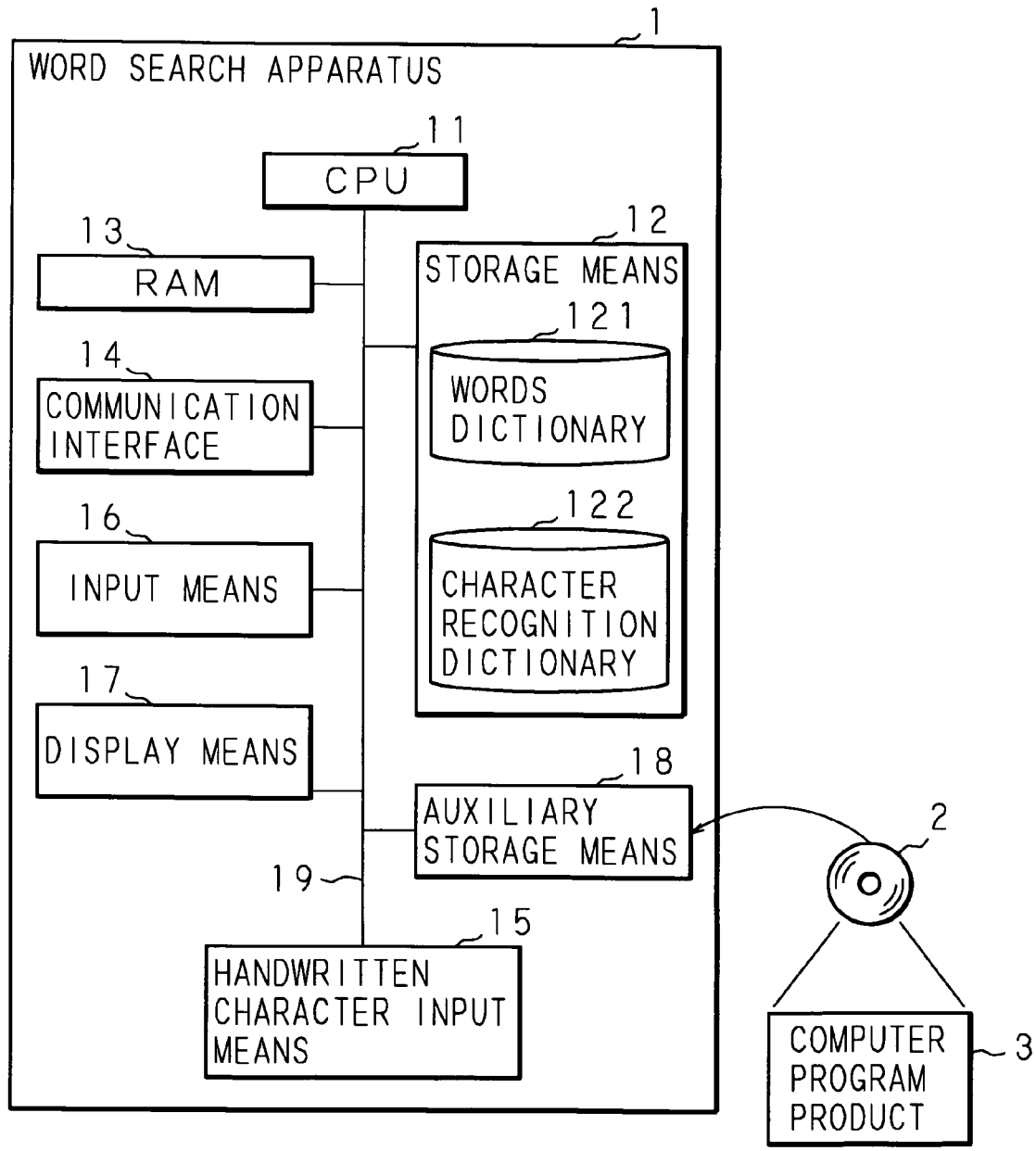
FIG. 2 is a block diagram illustrating a configuration of a word search apparatus in accordance with a first embodiment of the present invention.

Hereafter, a word search apparatus in accordance with a first embodiment of the present invention will be specifically described with reference to the drawings. FIG. 2 is a block diagram illustrating a configuration of a word search apparatus 1 in accordance with the first embodiment of the present invention. In FIG. 2, the word search apparatus 1 is comprised of, at least, a CPU (central processing unit) 11, a storage means 12, a RAM (memory) 13, a communication interface portion 14 connected with an external communication means, a handwritten character input means 15, such as a pen type tablet for receiving an input of a handwritten character, an input means 16, such as a mouse, a keyboard, or the like, a display means 17, such as a monitor or the like, and an auxiliary storage means 18.

The CPU 11 is connected with respective sections of a hardware of the aforementioned word search apparatus 1 via an internal bus 19, where it controls respective sections of the aforementioned hardware, and also executes various software-based functions according to a computer program product 3 stored in the storage means 12. The computer program product 3 stored in the storage means 12 may already be stored in the storage means 12 at the time of shipment of the word search apparatus 1, or may be stored in the storage means 12 via the auxiliary storage means 18 using the portable type recording medium 2, such as DVD, CD-ROM, or the like.

The storage means 12 is a fixed type recording medium represented by a hard disk, and is a storage means for storing the computer program product 3 to be executed, data used in the computer program product 3 to be executed, or the like. Moreover, the storage means 12 is provided with a words dictionary 121 for word search, and a character recognition dictionary 122 for storing a standard pattern of coordinate data for every character. The RAM 13 is comprised of an SRAM, a flash memory, or the like, and stores temporary data generated during software execution.

The communication interface portion 14 is connected with the internal bus 19, and by being connected with a cable, such as LAN, WAN, or the like, transmits and receives data required for the processing. The handwritten character input means 15 is also connected with the internal bus 19, and is comprised of an input medium of a handwritten character, such as a stylus pen, a pen type tablet, or the like to thereby receive a handwriting of the handwritten character as the coordinate data. The input means 16 is also connected with the internal bus 19, and is comprised of a pointing device, such as a mouse, a tablet, or the like, and a key entry device represented by a keyboard or the like. The display means 17 is also connected with the internal bus 19, and is comprised of a liquid crystal display, a CRT display, or the like.

The word search apparatus 1 having the aforementioned configuration, by generating, from the word list of the search result, parts of character strings corresponding to a writing input, makes the user select a correct a part of character string among them, and limits the word list of the search result to a word including the selected a part of character string to then display the limited word.

The handwritten character input means 15 receives the handwriting of the handwritten character written by a pen type tablet, a stylus pen, or the like as the coordinate data. The origin point of the coordinate data is not limited in particular, but may be the center of a display screen, or any one of four corners of the display screen. In addition, the handwritten character input means 15 may be a transparent tablet arranged in stacked form on a screen of the display means 17, or may not be limited in particular as far as it is a device capable of acquiring the coordinate data of the handwriting of the tablet or the like, which is separately arranged.

The CPU 11 of the word search apparatus 1 outputs, based on the coordinate data of the handwriting of the acquired handwritten character, a series of recognition candidate character strings. The CPU 11 then generates the coordinate data separated for every single character from the coordinate data of the handwriting of the handwritten character, and outputs the recognition candidate characters based on the comparison, for every character, with the standard pattern stored in the character recognition dictionary 122. Upon writing a handwritten character string, there are an input with frame where the handwritten character string is written in a character box for every single character, and an input without frame where it is written in an area without the character box. In the case of the input with frame, the handwritten data are beforehand separated for every character.

Figure 3:
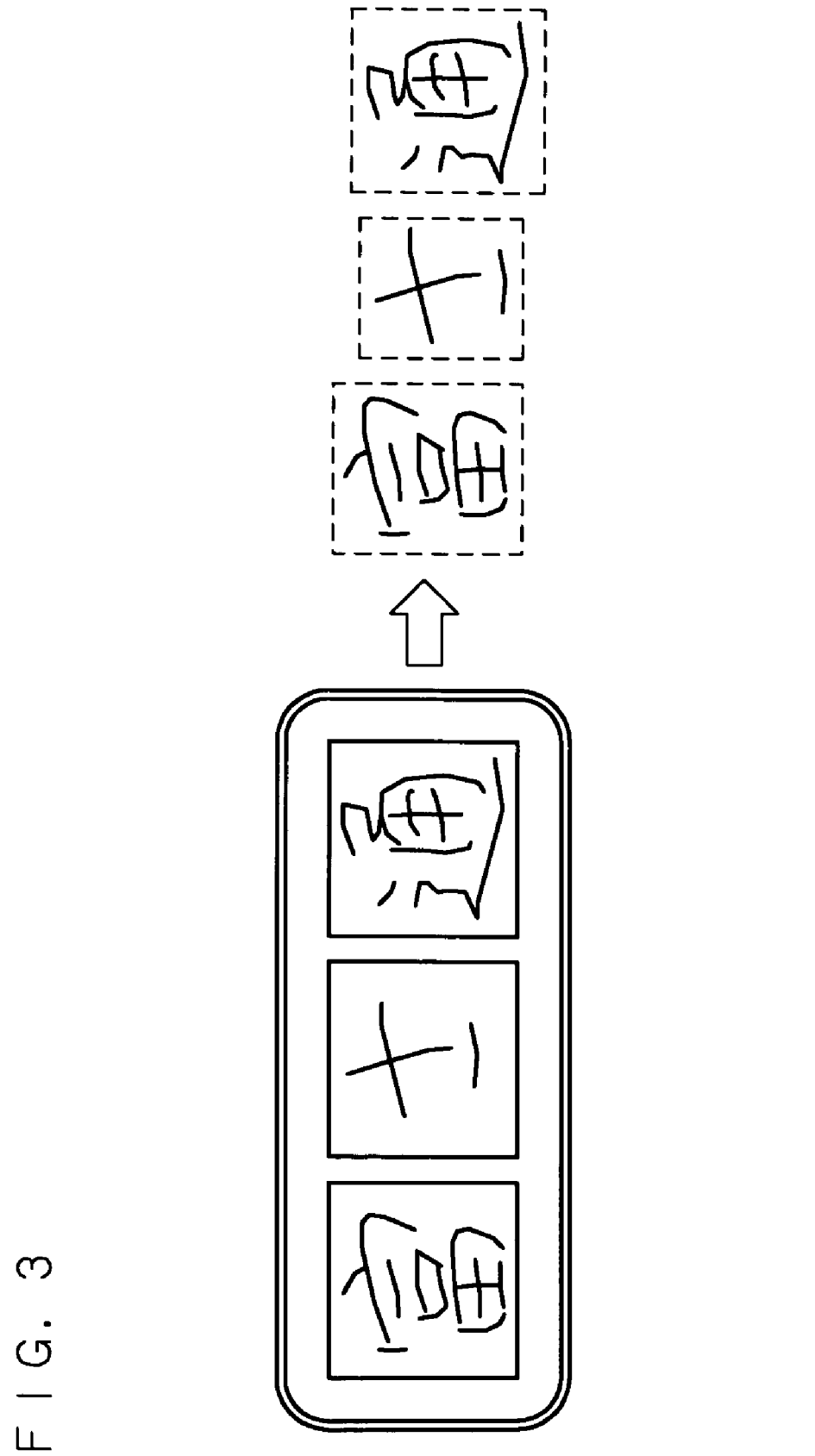
FIG. 3 is a diagram illustrating an example of a cut-out of a handwritten character in the case of an input with frame.

FIG. 3 is a diagram illustrating an example of a cut-out of the handwritten character in the case of the input with frame. In the case of input with frame, as shown in FIG. 3, the coordinate data written for every character box may be acquired as the coordinate data in the character box. FIG. 4 is a diagram illustrating an example of a cut-out of the handwritten character in the case of the input without frame. In the case of the input without frame, as shown in FIG. 4, it is necessary to acquire the coordinate data after the handwritten character string is split for every character. A method of splitting the character string without frame for every character is not limited in particular, but any well-known method may be used (for example, a split method disclosed in "Institute of Electronics, Information and Communication Engineers seminar technical research report PRMU98-139").

The CPU 11 compares the recognition candidate character for every character with a word to be a search target, and extracts a matched word from the words dictionary 121. A plurality of word character strings are stored in the Words dictionary 121, and an evaluation value (score) for indicating a degree of matching is obtained based on the comparison between each of the words and the recognition candidate character. The CPU 11 displays words having the score not less than a certain value in descending order of the score. Note herein that, sorting the display order of the word may simply rearrange the words in order of the score, and a well-known sort algorithm, such as a binary tree sort, a quick sort, or the like may be used.

Figure 5:
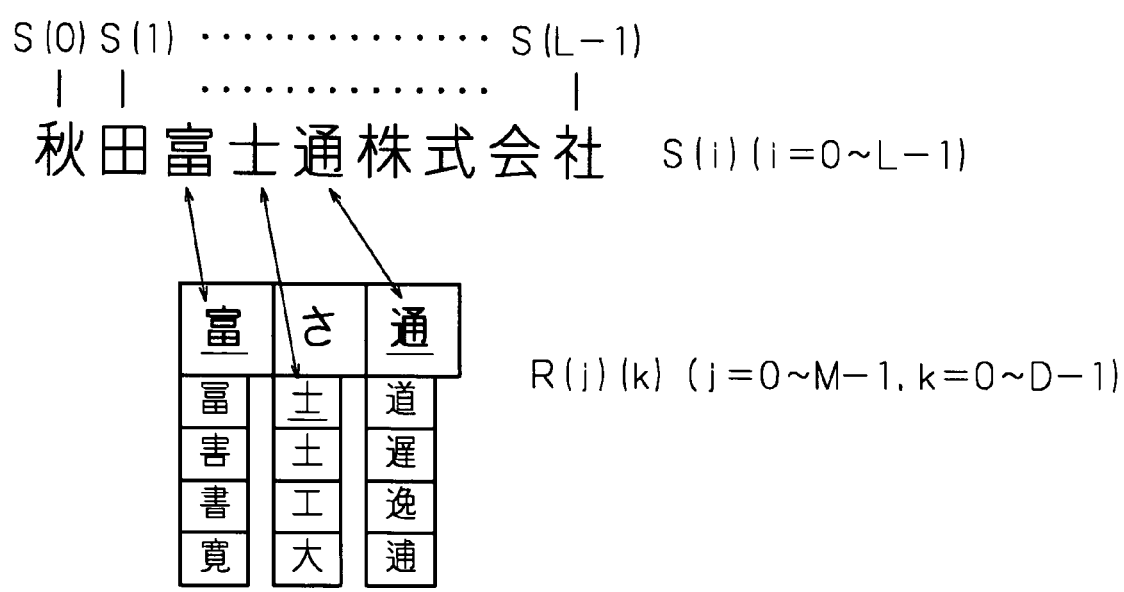
FIG. 5 is a diagram illustrating an example of a comparison between a recognition candidate character and a word character string.

The CPU 11 sequentially compares the recognition candidate character with the word character string. Herein, it is assumed to represent that the word character string for matching target is S(i), and the recognition candidate character is R (j)(k). FIG. 5 is a diagram illustrating an example of the comparison between the recognition candidate character and the word character string. In FIG. 5, L, M, and D represent a word length of the searched word, a character string length acquired as the handwritten character, and the number of recognition candidate characters, respectively. In the example shown in FIG. 5, "秋" of "秋田富士通株式会社" can be expressed with S(0), and the word length L is '9'. In addition, the written character string length M is '3', and the number of respective recognition candidate characters D is '5'. Hence, for example, a character "土" which is the third candidate in the second character may be represented with R (1)(2).

FIG. 6 is a chart illustrating a specific example of a program product for matching the recognition candidate character with the word character string. In FIG. 6, the program product is described with an algorithm of the word matching in C language. In FIG. 6, it is assumed that R is an array of a structure (struct RS) in which the character code (code) and the score indicating the degree of matching of the character (score) are elements. Function match, when the recognition candidate character R (j)(k), and the word S(i) are provided to an argument, searches for a portion whose degree of matching between the word and recognition candidate character is the highest to thereby calculate the score. If a character that matches with the character in the word is found, the score of the character is added to a total score maxScore, while if not, a constant value CONST is added thereto. Herein, if the matched characters do not reach the half of the writing characters in number, the score will be '0' as there is no matching.

According to the program product described in FIG. 6, as a result of the comparison between the word and the recognition candidate character, if characters the number of which is not less than a certain value, match therewith, the degree of matching is stored in argument pSc and function match returns TRUE. In that case, a starting position matching with the word (in the case of FIG. 5, since it begins with the third character "富", it is '2'), and a history of the matched candidate are stored in pSt, pPath, respectively.

Figure 7:
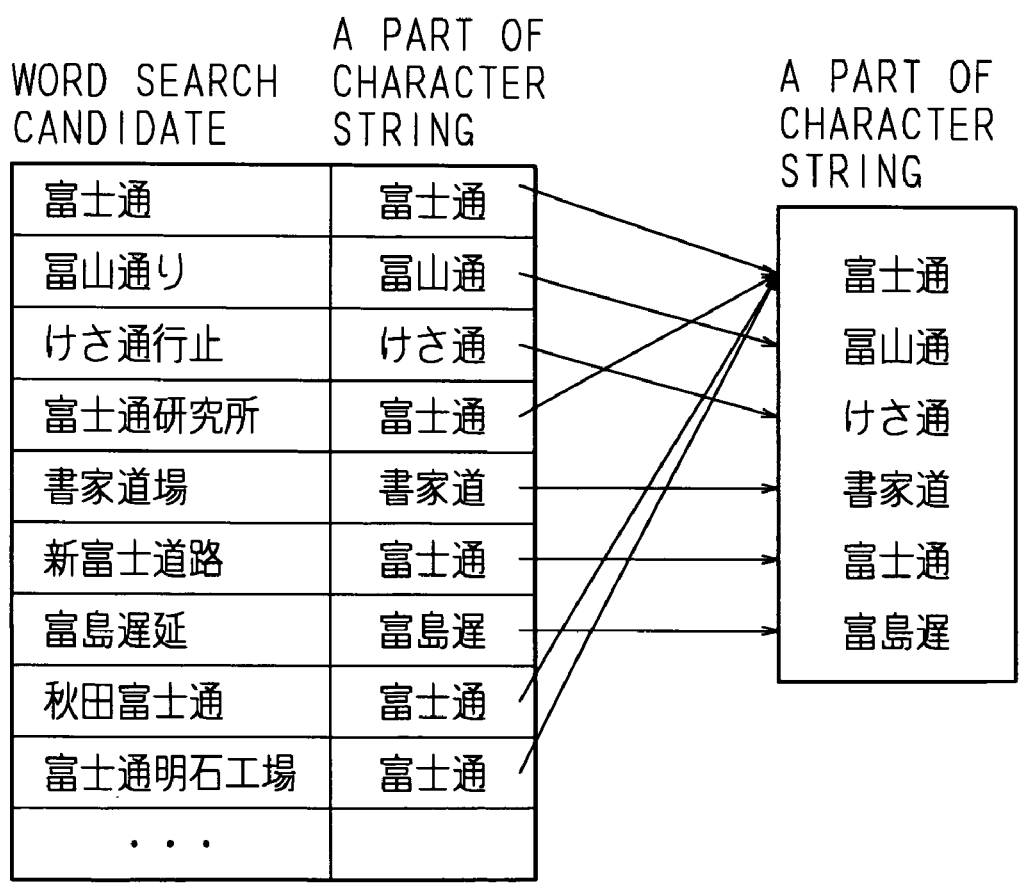
FIG. 7 is a diagram schematically illustrating a search result limiting procedure of the word search apparatus in accordance with the first embodiment of the present invention.

FIG. 7 is a diagram schematically illustrating a search result limiting procedure of the word search apparatus 1 in accordance with the first embodiment of the present invention. The CPU 11, by generating a plurality of recognition candidate character strings based on the aforementioned pattern matching, and searching in the words dictionary 121 by using the plurality of recognition candidate character strings as key information, extracts many words as the search result as shown in FIG. 7. The CPU 11 of the word search apparatus 1 extracts a part of character string corresponding to the character string which the user actually has written from the extracted search result. In, for example, FIG. 7, when the searched word is "富士通明石 工場", characters matched with the written portion are "富士通", from the first character to the third character. As a result, "富士通", is extracted as a part of character string.

According to the program product described in FIG. 6, a position of the part of character string is stored in an area that pSt which is an argument of function match indicates. Since a position of the first character of the matched portion is represented with *pSt, the first character (namely, "富",) is S (*pSt), and the second character is S (*pSt+1). As described above, by storing the history in the search result, the part of character string can be easily generated.

Moreover, in the program product shown in FIG. 6, one part of character string is obtained to one word character string. By applying this procedure to all of the search result, a table, as shown in a left table in FIG. 7, where the part of character string is associated with each of the search words can be obtained. Here, the same part of character string is consolidated into one, and each of them creates link information. As for the processing for consolidating the same character string, a widely used technique may be used in a manner similar to that of sorting the character string. Based on above procedure, a part of character string information which describes a correspondence between the search result word and the part of character string corresponding to each of them can be obtained.

Groups of the parts of character strings, for example, groups of the parts of character strings including "富士通","富山通","富さ通" and the like are generated like this, the number of parts of character strings presented to the user will be less than the search result of the words dictionary 121. As a result, the number of words displayed as the search result can be reduced.

Figure 8:
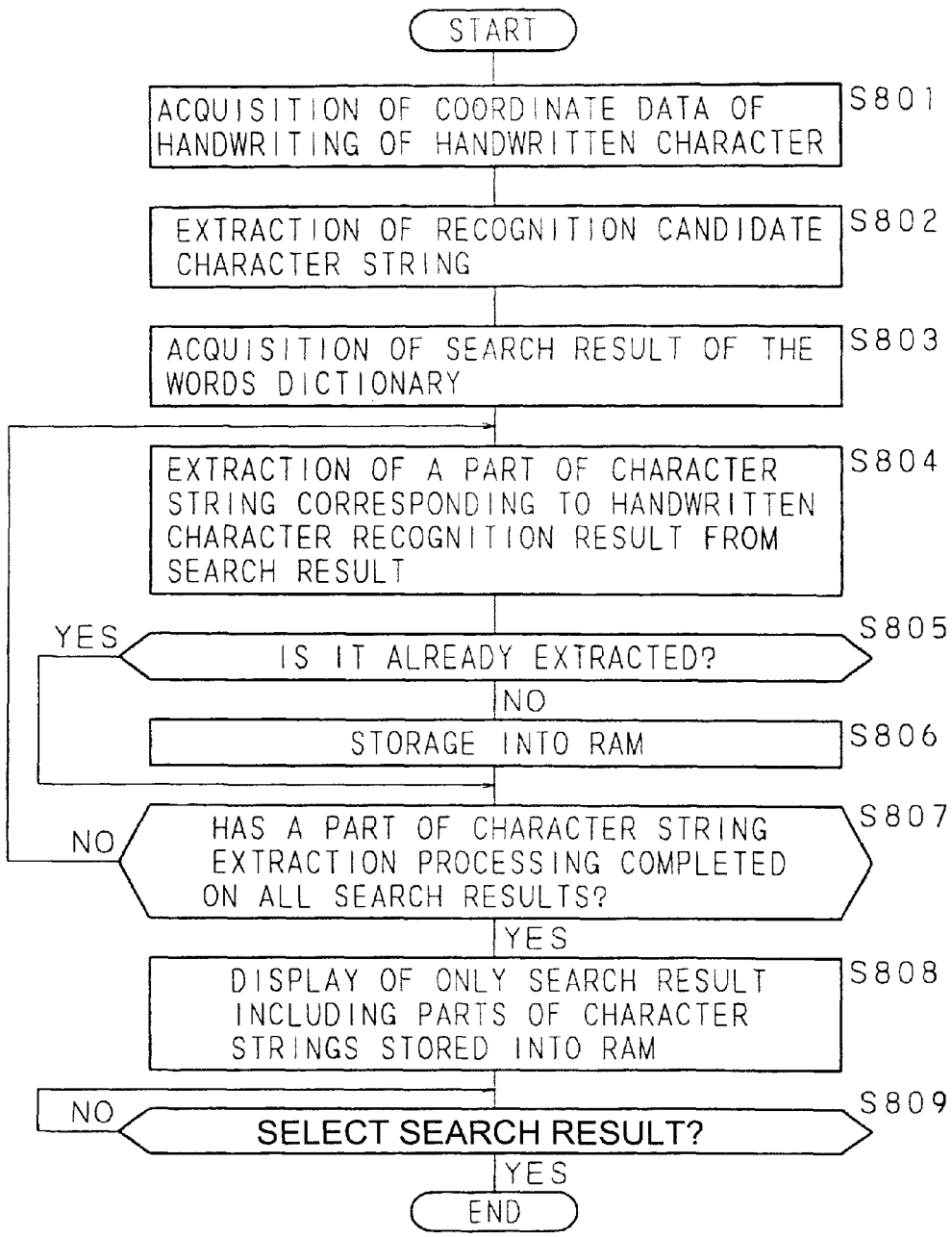
FIG. 8 is a flow chart illustrating a procedure of a CPU used in the word search apparatus in accordance with the first embodiment of the present invention.

FIG. 8 is a flow chart illustrating a procedure of the CPU 11 used in the word search apparatus 1 in accordance with the first embodiment of the present invention. The CPU 11 of the word search apparatus 1 acquires the coordinate data of the handwriting of the handwritten character written by a pen type tablet, a stylus pen, or the like (Step S801). The CPU 11, based on the acquired coordinate data of the handwriting of the handwritten character, references to the character recognition dictionary 122 to extract a series of the recognition candidate character strings (Step S802).

The CPU 11 compares the recognition candidate character for every character with the word to be the search target to thereby acquire the word including the recognition candidate character from the words dictionary 121 as the search result (Step S803). The CPU 11 extracts, from the extracted search result, the part of character string corresponding to the character string (recognition result of the handwritten character) that the user has actually written (Step S804).

The CPU 11 determines whether or not the extracted a part of character string has been already extracted, namely, whether or not it has already been stored in the RAM 13 (Step S805). If the CPU 11 determines it has not been extracted yet (Step S805: NO), the CPU 11 stores the extracted a part of character string in the RAM 13 (Step S806), while if the CPU 11 determines it has already been extracted (Step S805: YES), the CPU 11 skips Step S806. Note herein that, it is not limited to a method of acquiring the part of character string after acquiring all of the search result as described above, but it may be a method of searching the part of character string, for example, whenever one part of character string is searched.

The CPU 11 determines whether or not the extraction processing of the part of character string has been completed on all of the extracted search result (Step S807). If the CPU 11 determines that it has not completed yet (Step S807: NO), the CPU 11 returns the process to Step S804 to repeat the aforementioned process. If the CPU 11 determines that it has been completed (Step S807: YES), the CPU 11 outputs only the search result including the part of character string stored in the RAM 13 to the display means 18 to display it (Step S808).

Groups of the part of character string, for example, groups of the parts of character strings including "富士通","富山通","富さ通" and the like are generated like this, so that the number of parts of character strings presented to the user will be less than the search result of the words dictionary 121. As a result, the number of words displayed as the search result can be reduced.

The CPU 11 will be in a waiting state until receiving a selection of the search result by the user (Step S809), and if the CPU 11 determines the selectionilis received (Step S809: YES), the CPU 11 completes the word search processing.

Figure 9A:
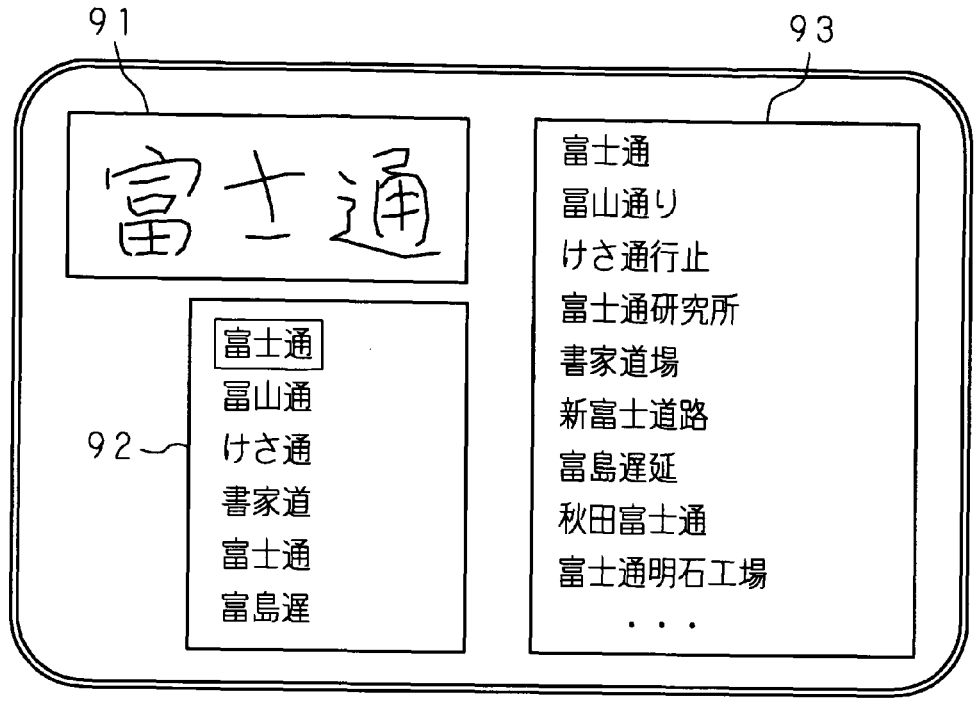
FIGS. 9A and 9B are diagrams illustrating an example of a display screen of the word search apparatus in accordance with the first embodiment.
Figure 9B:
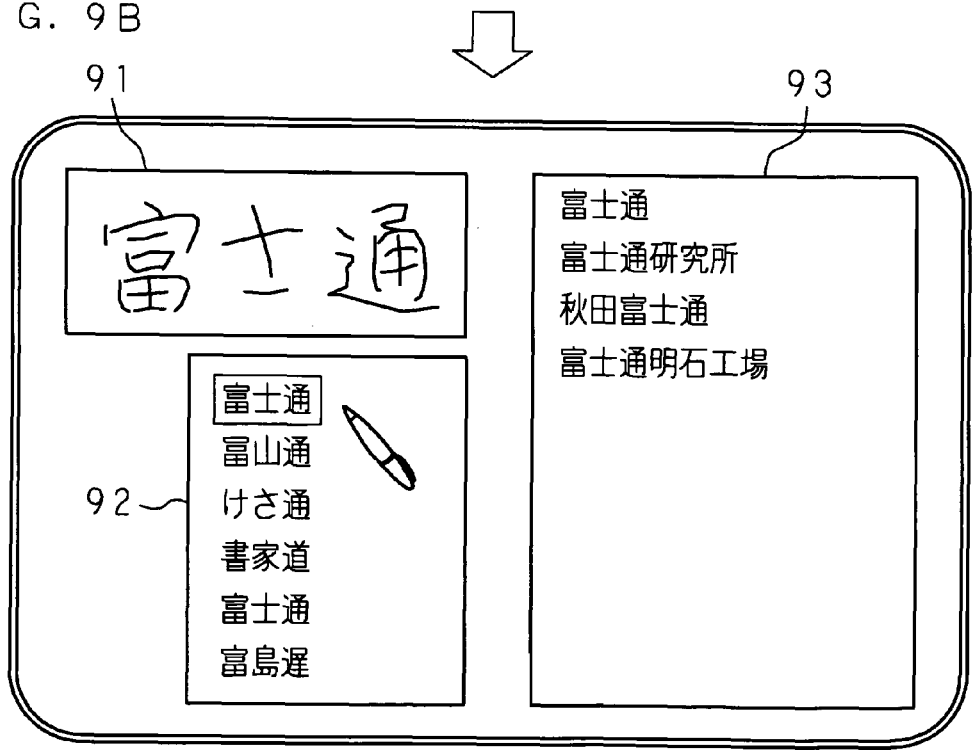

FIGS. 9A and 9B are diagrams illustrating an example of the display screen of the word se arch apparatus 1 in accordance with this first embodiment. In FIGS. 9A and 9B, the display screen is composed of a handwritten character input area 91, a part of character string display area 92, and a search result display area 93. As shown in FIG. 9A, when "富士通", is inputted into the handwritten character input area 91 in the handwritten character, while the search result of the words dictionary 121 is displayed in the search result display area 93, the part of character string extracted by the aforementioned processing is displayed in the part of character string display area 92.

The user, as shown in FIG. 9B, selects a desired part of character string from the parts of character strings displayed in the part of character string display area 92 with a stylus pen or the like. By the part of character string being selected, the number of search results displayed in the search result display area 93 will be greatly reduced. The user, by selecting a desired result from the search result candidates displayed in the search result display area 93, with a stylus pen or the like, can easily search for the word.

Figure 10:
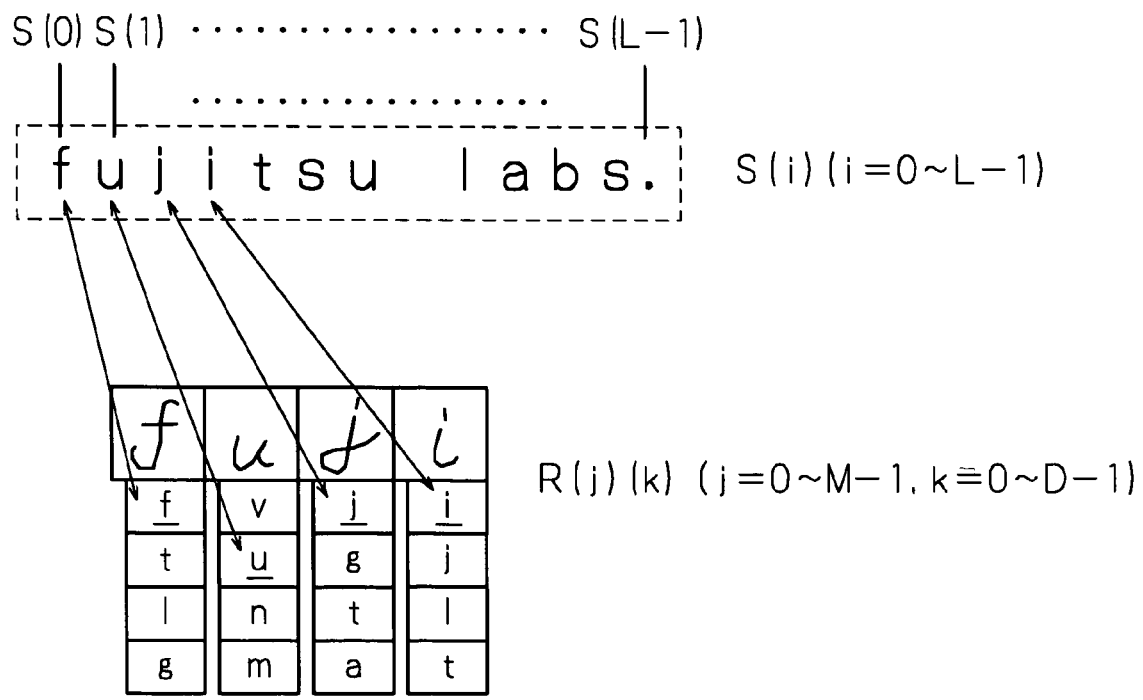
FIG. 10 is a diagram illustrating an example of a comparison between a recognition candidate character and the word character string when the handwritten character is an alphabetic word.

A similar processing may also be realized in an alphabetic word. For example, when the coordinate data of "fuji" in longhand is acquired as the handwritten character, the comparison between the recognition candidate character and the word character string will be shown in FIG. 10. FIG. 10 is a diagram illustrating an example of the comparison between the recognition candidate character and the word character string, when the handwritten character is an alphabetic word. In FIG. 10, L, M, and D represent a word length of the searched word, a character string length acquired as the handwritten character, and the number of recognition candidate characters, respectively. In the example shown in FIG. 10, "f" of "fujitsu labs." can be expressed with S (0), and the word length L is '13'. Additionally, the written character string length M is '4', and the number of respective recognition candidate characters D is '5'. Hence, for example, a character "u" which is the third candidate of the second character may be represented with R (1)(2).

A matching process is executed according to the program product shown in FIG. 6, and if characters the number of which is not less than a certain value, match therewith, the degree of matching is stored in argument pSc and function match returns TRUE. In that case, a starting position matching with the word (in the case of FIG. 10, since it begins with the first character "f", it is '0'), and a history of the matched candidate are stored in pSt, pPath, respectively.

Figure 11:
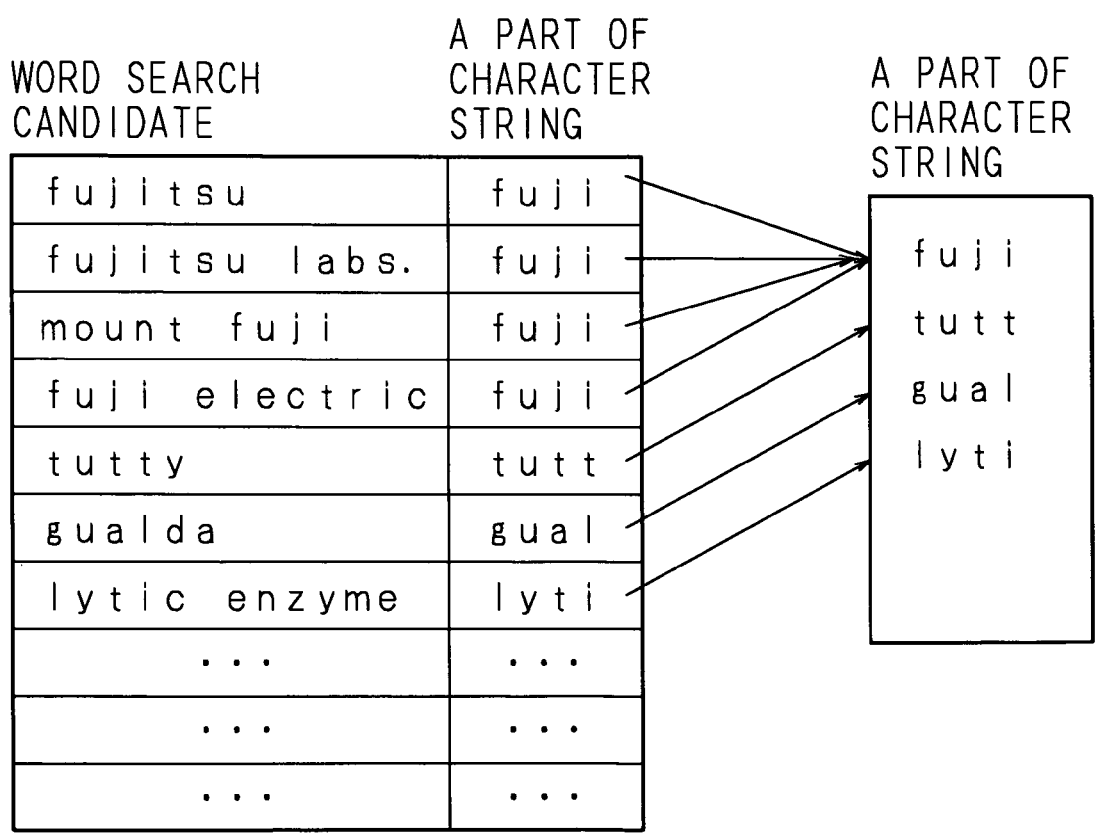
FIG. 11 is a diagram schematically illustrating the search result limiting procedure of the word search apparatus when the handwritten character is the alphabetic word.

FIG. 11 is a diagram schematically illustrating the search result limiting procedure of the word search apparatus 1 when the handwritten character is the alphabetic word. The CPU 11, by generating a plurality of recognition candidate character strings based on the aforementioned pattern matching, and searching in the words dictionary 121 by using the plurality of recognition candidate character strings as key information, extracts many words as the search result as shown in FIG. 11. The CPU 11 of the word search system 1 extracts a part of character string corresponding to the character string which the user actually has written from the extracted search result. In, for example, FIG. 11, when the searched word is "fujitsu", characters matched with the written portion are "fuji" from the first character to the fourth character. As a result, "fuji" is extracted as a part of character string.

In the program product described in FIG. 6, a position of the part of character string is stored in an area that pSt which is an argument of function match indicates. Since a position of the first character of the matched portion is represented with *pSt, the first character (namely, "f") is S (*pSt), and the second character is S (*pSt+1). As described above, by storing the history in the search result, the part of character string may be easily generated.

Moreover, in the program product shown in FIG. 6, one part of character string is obtained to one word character string. By applying this procedure to all of the search result, as shown in a left table in FIG. 11, where the part of character string is associated with each of the search words can be obtained. Here, the same part of character string is consolidated into one, and each of them creates link information. As far the processing for consolidating the same character string, a widely used technique may be used in a manner similar to that of sorting the character string. Based on above procedure, a part of character string information which describes a correspondence between the search result word and the part of character string corresponding to each of them can be obtained.

Groups of the part of character string, for example, groups of the parts of character strings including "fuji", "tutt", "gual", or the like are generated like, this, so that the number of parts of character strings presented to the user will be less than the search result of the words dictionary 121. Herein, the part of character string that the user intends is selected from the displayed parts of character strings, and only the search result including the selected a part of character string is displayed, thus allowing the number of words displayed as the search result to be further reduced.

Figure 12A:
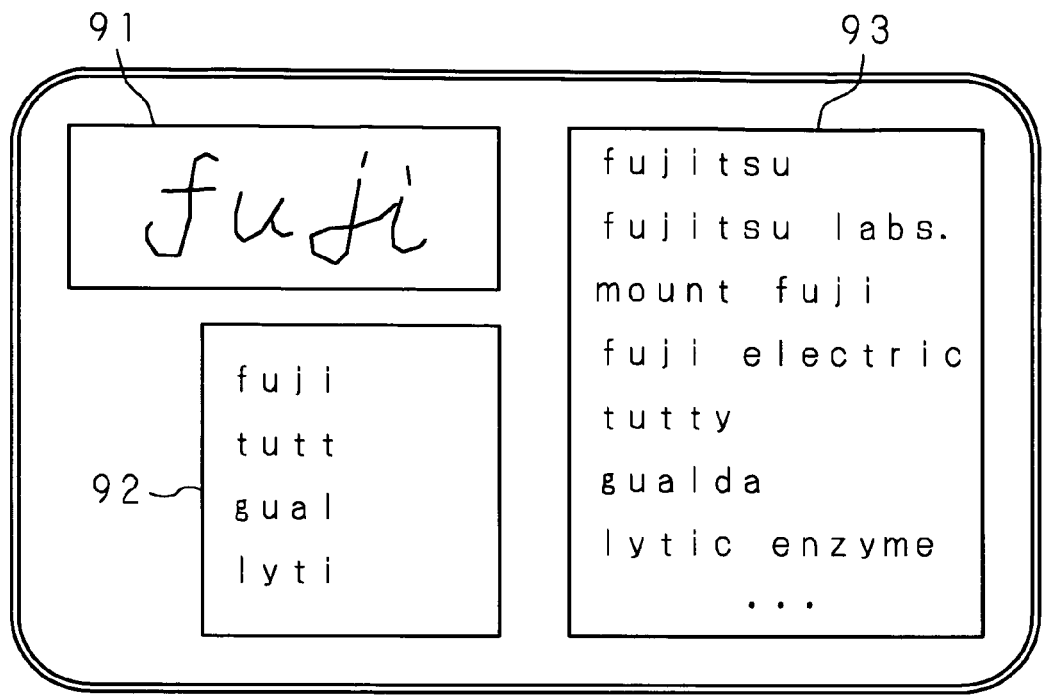
FIGS. 12A and 12B are diagrams illustrating an example of the display screen of the word search apparatus when the handwritten character is the alphabetic word.
Figure 12B:
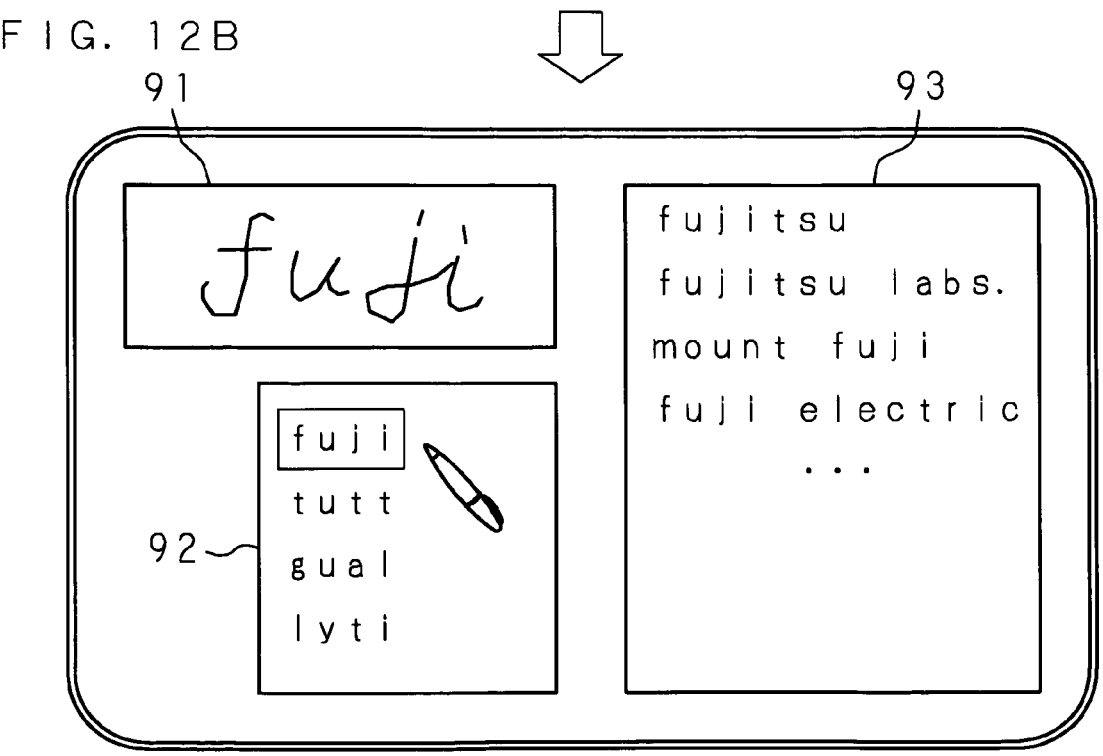

FIGS. 12A and 12B are diagrams illustrating an example of the display screen of the word search apparatus 1 when the handwritten character is the alphabetic word. As shown in FIG. 12A, when "fuji" is inputted into the handwritten character input area 91 in the handwritten character, while the search result of the words dictionary 151 is displayed in the search result display area 93, the part of character string extracted by the aforementioned processing is displayed in the part of character string display area 92.

The user, as shown in FIG. 12B, selects a desired part of character string (for example "fuji") from the part of character strings displayed in the part of character string display area 92 with a stylus pen or the like. By the part of character string being selected, the number of search results displayed in the search result display area 93 will be greatly reduced. The user, by selecting a desired result from the search result candidates displayed in the search result display area 93, with a stylus pen or the like, can easily search for the word.

As described above, according to the first embodiment, it is possible to limit the part of character string to be the key information for searching in the words dictionary, thus allowing a significant reduction in the number of words to be search candidates. As a result, the number of word candidates to be presented to the user can be reduced, so that an improvement in word search efficiency can be achieved, thus, making it possible to expect advantages, such as fatigue reduction or the like, upon the user performing the word search.

Second Embodiment

Hereafter, the word search apparatus 1 in accordance with a second embodiment of the present invention will be specifically described with reference to the drawings. Since a configuration of the word search apparatus 1 in accordance with the second embodiment of the present invention is similar to that of the first embodiment, the same reference numeral is given to a part having a similar function, and detailed description thereof will be omitted. The present second embodiment is different from the first embodiment in that a candidate character list for splitting the part of character string for every candidate character is generated, and the user can correct a recognition error for every single character.

Figure 13:
FIG. 13 is a diagram illustrating an example of a candidate character list.

FIG. 13 is a diagram illustrating an example of the candidate character list. The candidate character list is list information for displaying, based on a predetermined priority level, a candidate character which is a character unit of the extracted a part of character string. In the example of FIG. 13, the part of character string has three characters, and the same candidate characters are consolidated into one for every character and are converted into the candidate character list.

Figure 14:
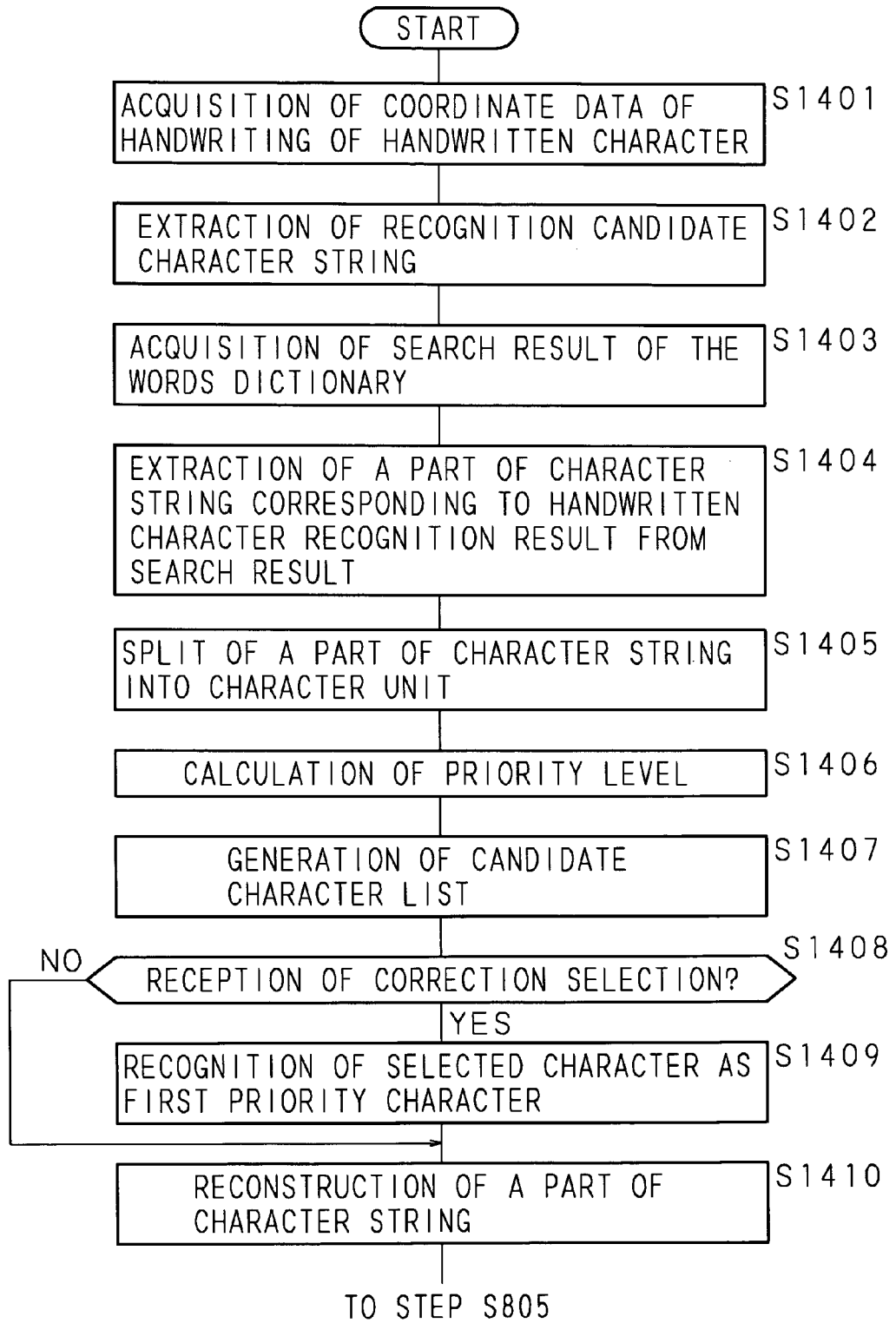
FIG. 14 is a flow chart illustrating a procedure of a CPU used in a word search apparatus in accordance with a second embodiment of the present invention.

FIG. 14 is a flow chart illustrating a procedure of the CPU 11 used in the word search apparatus 1 in accordance with the second embodiment of the present invention. The CPU 11 of the word search system 1 acquires the coordinate data of the handwriting of the handwritten character written by a pen type tablet, a stylus pen, or the like (Step S1401). The CPU 11, based on the acquired coordinate data of the handwriting of the handwritten character, references to the character recognition dictionary 122 to extract a series of recognition candidate character strings (Step S1402).

The CPU 11 compares the recognition candidate character for every character with the word to be the search target to acquire a matched word from the words dictionary 121 as the search result (Step S1403). The CPU 11 extracts, from the extracted search result, the part of character string corresponding to the character string (recognition result of the handwritten character) that the user has actually written (Step S1404).

The CPU 11 then splits the extracted part of character string into a character unit (Step S1405), calculates a priority level for every split character (Step S1406), and crates the candidate character list (Step S1407). The generated candidate character list is displayed, upon correction processing, on the display means according to the priority level, and receives the user's selection, thus allowing the recognition error to be corrected. Note herein that, a calculation method of the priority level is not limited in particular, but any method including a method described hereinbelow or the like may be used as far as it can specify a list order.

Figure 15:
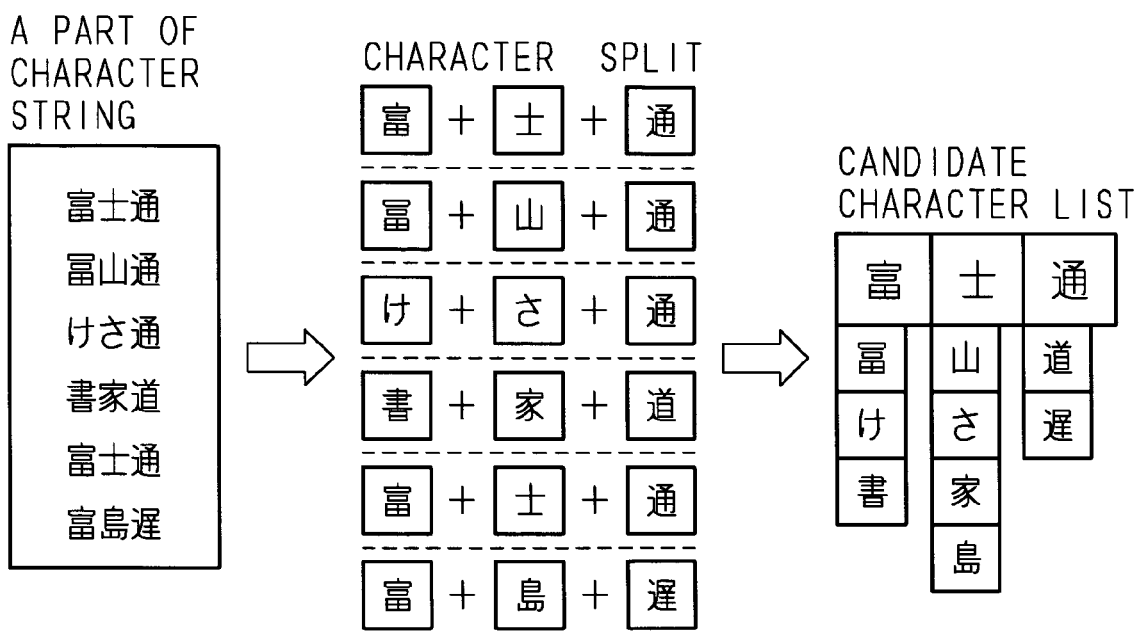
FIG. 15 is a diagram schematically illustrating a procedure for generating a candidate character list.

FIG. 15 is a diagram schematically illustrating a procedure for generating the candidate character list. As shown in FIG. 15, the extracted part of character string is split for every character, and the same characters at the same position are consolidated into one, so that the candidate character list is generated. The candidate character list is displayed, upon correcting recognition error, for every character, and receives the selection by a stylus pen or the like.

The CPU 11 determines whether or not the selection of the correction has been received for every character (Step S1408), and if the CPU 11 determines the selection of the correction has been received (Step S1408: YES), it sets the priority level of the selected character to be highest among the received characters, and recognizes this character as the first priority character (Step S1409).

Figure 16:
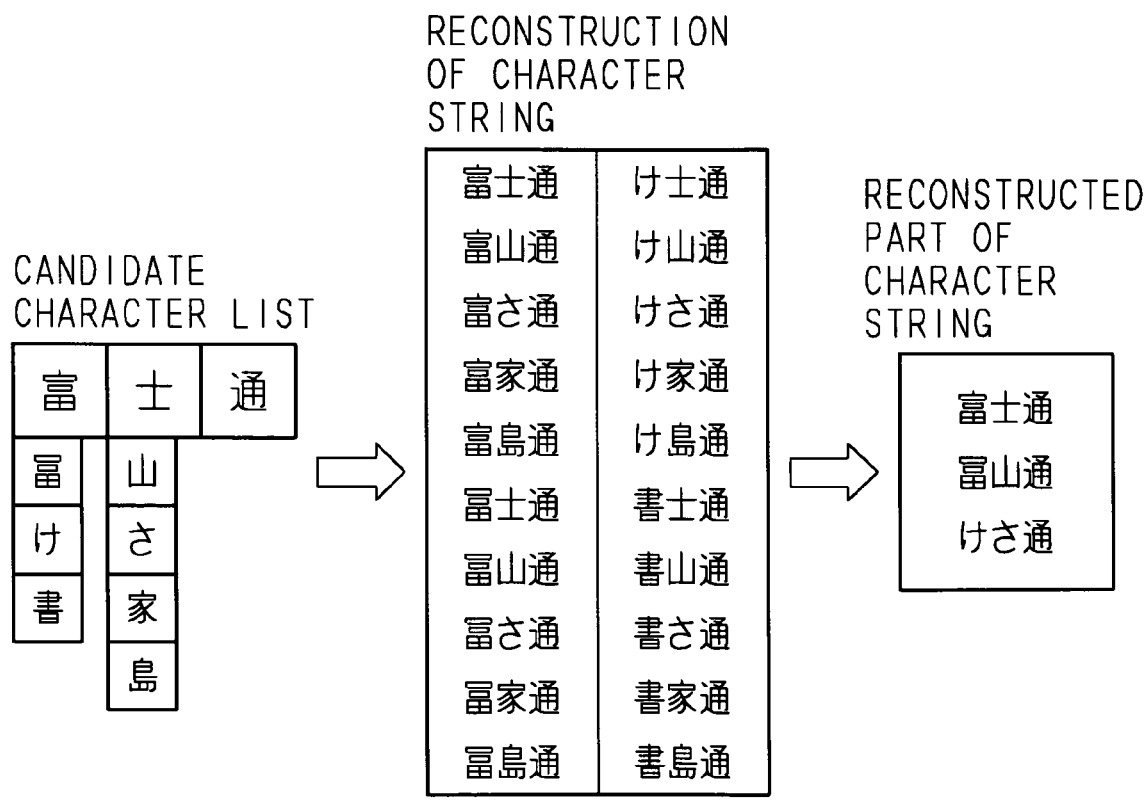
FIG. 16 is a diagram schematically illustrating a part of character string reconstructing procedure.

The CPU 11 reconstructs the part of character string based on the character after the correction (Step S1410), and continues the process after Step S805 of the first embodiment. The reconstruction of the part of character string is a processing for newly generating a part of character string using characters decided by receiving the selection; FIG. 16 is a diagram schematically illustrating the part of character string reconstructing procedure. In FIG. 16, when the third character "通", is selected and decided, the number of character strings which can be composed including other candidate characters will be limited to 20 as shown in a middle table of FIG. 16. Using the limited character strings as the recognition candidate character strings, character strings which match with the character string acquired as the handwritten character are extracted as the part of character string, so that three parts of character strings represented in the right table of FIG. 16 are reconstructed.

As described above, by generating the candidate character list from the part of character string, even when a character which should be correctly recognized is missing from the recognition candidate characters, a character can be complemented from the word displayed as the search result, so that it becomes possible to display it in the candidate character list upon correction as the character to be selected.

Note herein that, a method of specifying the display priority level in displaying the candidate character list is not limited in particular. For example, it may be a method of displaying, at the higher priority, the candidate character for composing the same part of character string obtained for the user to combine a list of character candidates presented to the user regarding the character in the candidate selection, with the other characters. As a result of this, the selection of the correct character becomes easier.

FIG. 17 is a diagram illustrating an example of a screen display upon correcting the candidate character. In FIG. 17, the three characters "富士通", are displayed at the first priority level, and the candidate character list is displayed where the third character "通", is a correction target. As shown in FIG. 17, three candidate characters "通","道", and "遲" are present in the third character in the candidate character list. However, since the parts of character strings including "富", and "士" which are displayed in the first character and the second character are only "富士通", and "富士道", the third character displays "通", and "道", at the higher priority. Although "遲" with the lower priority is represented with the dotted line in FIG. 17, it may be displayed or not.

Figure 18:
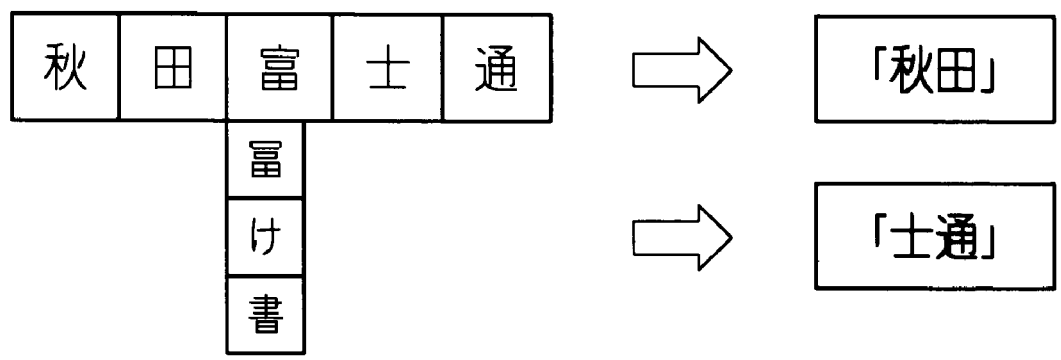
FIG. 18 is a diagram illustrating an example of a priority character string.

Moreover, as for the character string displayed in a position other than the character to be a selection target of the candidate character, namely the third character "通", in FIG. 17, a new character string may be generated, based on a display state of the candidate character, in front and back portions thereof to display, at the higher priority, a candidate character having a closer relation with the new character string. FIG. 18 is a diagram illustrating an example of a priority character string. In FIG. 18, the third character "通", is the selection target of the candidate character, where "秋田" and "士通" are generated as the front priority character string and the back priority character string, respectively. The CPU 11 selects, from the parts of character strings, the character string including both of two kinds of priority character strings to rearrange the candidate character list so that the candidate character included therein may be displayed at the higher priority. As a result of this, a candidate character having a closer relation with a currently displayed character string can be displayed at the higher priority, thus, making the user's selection of the candidate character easier.

Figure 19:
FIG. 19 is a diagram illustrating an example of the candidate character list at the time of acquiring coordinate data of "fuji" in longhand as the handwritten character.

A similar processing can be realized also in the alphabetic word in a manner similar to that of the first embodiment. FIG. 19 is a diagram illustrating an example of the candidate character list upon acquiring the coordinate data of "fuji" in longhand as the handwritten character. The candidate character list is list information for displaying, based on a predetermined priority level, a candidate character which is a character unit of the extracted a part of character string. In the example of FIG. 19, the part of character string has four characters, and the same candidate characters are consolidated into one for every character, and are converted into the candidate character list.

Figure 20:
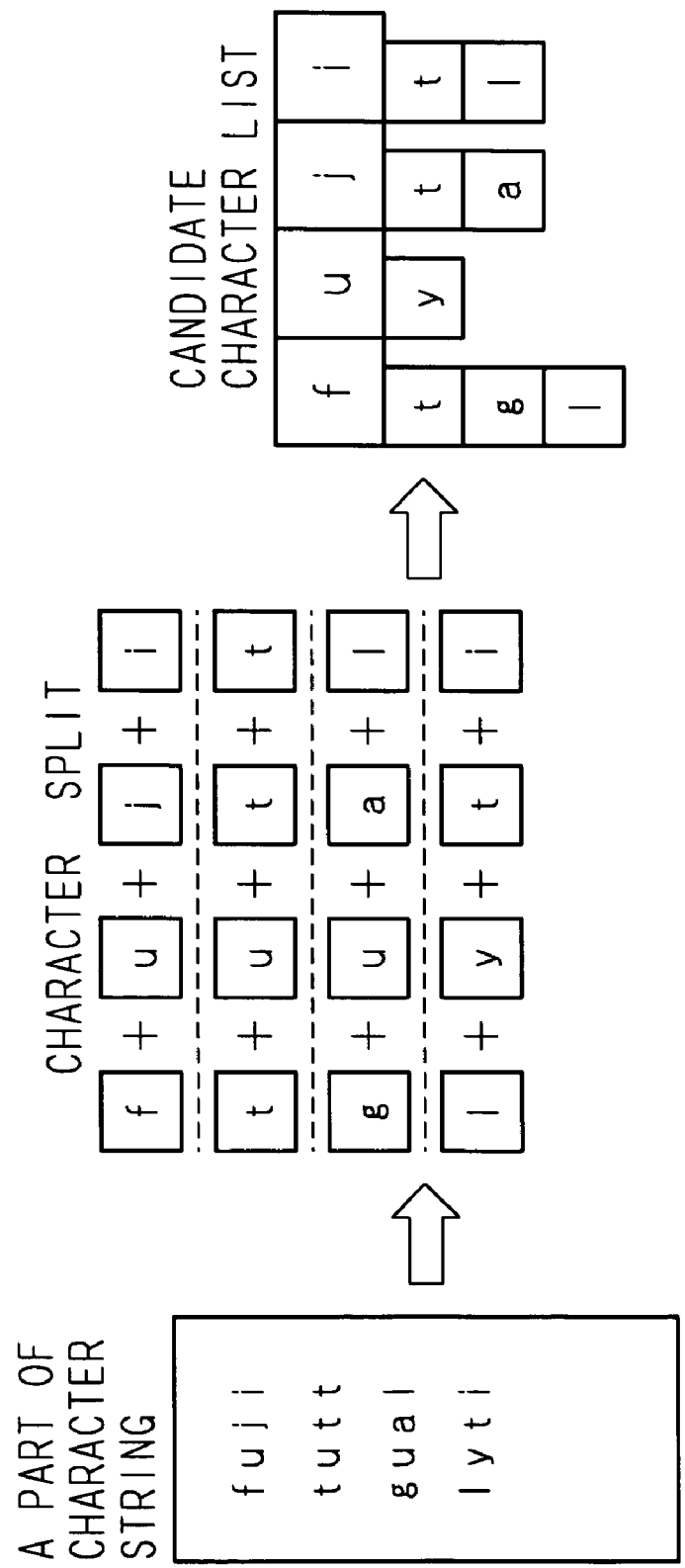
FIG. 20 is a diagram schematically illustrating a procedure for generating the candidate character list when the handwritten character is the alphabetic word.

FIG. 20 is a diagram schematically illustrating a procedure for generating the candidate character list when the handwritten character is the alphabetic word. As shown in FIG. 20, the extracted part of character string is split for every character, and the same characters at the same position are consolidated into one, so that the candidate character list is generated. The candidate character list is displayed, upon correcting recognition error, for every character, and receives the selection by a stylus pen or the like.

Figure 21:
FIG. 21 is a diagram schematically illustrating a part of character string reconstruction processing when the handwritten character is the alphabetic word.

FIG. 21 is a diagram schematically illustrating a part of character string reconstructing procedure when the handwritten character is the alphabetic word. In FIG. 21, when the fourth character "i" is selected and decided, the number of character strings which can be composed including other candidate characters will be limited to 24 as shown in a middle table of FIG. 21. Using the limited character strings as the recognition candidate character strings, the character strings which match with the character string acquired as the handwritten character are extracted as the part of character string, so that two parts of character strings "fuji" and "lyti" represented in a right table of FIG. 21 are reconstructed.

As described above, by generating the candidate character list from the part of character string, even when a character which should be correctly recognized is missing from the recognition candidate characters, a character can be complemented from the word displayed as the search result, it becomes possible to display it in the candidate character list upon correction as the character to be selected.

Note herein that, a method of specifying the display priority level in displaying the candidate character list is not limited in particular. For example, it may be a method of displaying, at the higher priority, the candidate character for composing the same part of character string obtained for the user to combine a list of character candidates presented to the user regarding the character in the candidate selection, with the other characters. As a result of this, the selection of the correct character becomes easier.

Figure 22:
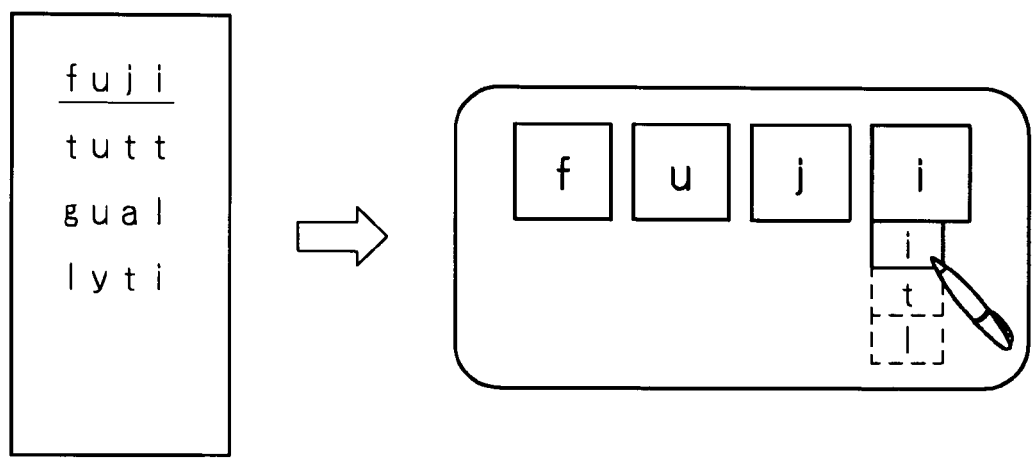
FIG. 22 is a diagram illustrating an example of a screen display upon correcting the candidate character when the handwritten character is the alphabetic word.

FIG. 22 is a diagram illustrating an example of a screen display upon correcting the candidate character, when the handwritten character is the alphabetic word. In FIG. 22, four characters "fuji" are displayed at the first priority level, and the candidate character list is displayed where the fourth character "i" is a correction target. As shown in FIG. 22, three candidate characters "j", "t", and "a" are present in the third character in the candidate character list. However, since the part of character string including "f", "u", and "j" which are displayed from the first character through the third character is only "fuji", the fourth character displays only "i" at the higher priority. Although "t" and "l" with the lower priority are represented with the dotted line in FIG. 22, they may be displayed or not.

Moreover, as for the character string displayed in a position other than the character to be a selection target of the candidate character, a new character string may be generated, based on a display state of the candidate character, in front and back portions to display, at the higher priority, a candidate character having a closer relation with the new character string. FIG. 23 is a diagram illustrating an example of the priority character string when the handwritten character is the alphabetic word. In FIG. 23, the third character "j" is the selection target of the candidate character, where "fu" and "i" are generated as the front priority character string and the back priority character string, respectively. The CPU 11 selects, from the parts of character strings, the character string including both of two kinds of priority character strings to rearrange the candidate character list so that the candidate character included therein may be displayed at the higher priority. As a result of this, a candidate character having a closer relation with a currently displayed character string can be displayed at the higher priority, thus, making the user's selection of the candidate character easier.

As described above, according to the second embodiment, it is possible to limit the part of character string to be the key information for searching in the words dictionary, thus allowing a significant reduction in the number of words to be search candidates. As a result, the number 6f word candidates to be presented to the user can be reduced, so that an improvement in word search efficiency can be achieved, thus, making it possible to expect advantages, such as fatigue reduction or the like, upon the user performing the word search. Moreover, generating the candidate character list from the part of character string makes it possible to beforehand prevent the candidate character from being missed, thus allowing the user to surely correct the recognition error.

Third Embodiment

Hereafter, the word search apparatus 1 in accordance with a third embodiment of the present invention will be specifically described with reference to the drawings. Since a configuration of the word search apparatus 1 in accordance with the third embodiment of the present invention is similar to that of the first embodiment, the same reference numeral is given to a part having a similar function, and detailed description thereof will be omitted. The present third embodiment has a feature in that only when the number of words to be outputted and displayed as the search result is larger than a predetermined value, the word search processing for generating the aforementioned part of character string is executed.

In other words, when the number of words of the search result is not so many, it is not necessity to limit the number of words based on the part of character string in particular, so that the user may directly select the desired word among the words displayed as the search result. For that reason, the CPU 11 counts the total number of words displayed as the search result, and determines whether or not the number of counted words exceeds a predetermined value, for example, about ten words which can be displayed on the screen at once. If the CPU 11 determines that it is not more than ten words, the generation processing of the part of character string like the first and second embodiments may not be executed.

Figure 24:
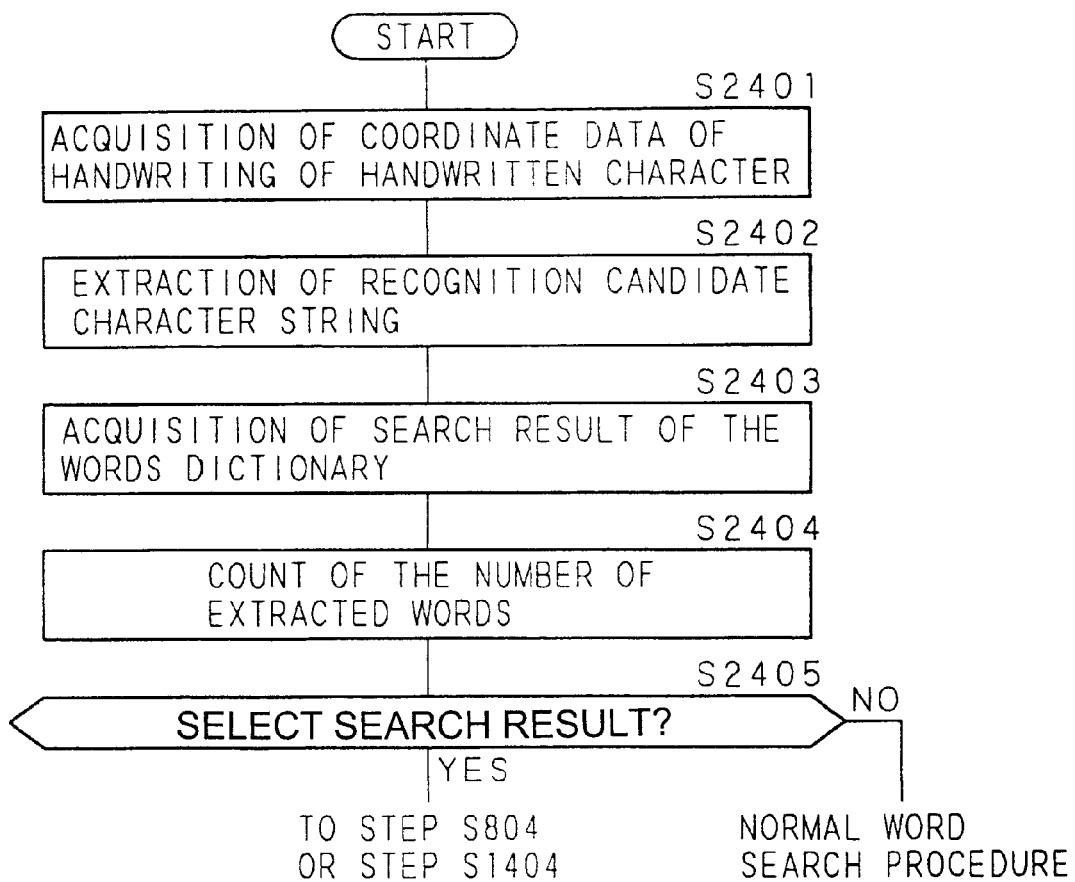
FIG. 24 is a flow chart illustrating a procedure of a CPU used in a word search apparatus in accordance with a third embodiment of the present invention.

FIG. 24 is a flow chart illustrating a procedure of the CPU 11 used in the word search system 1 in accordance with the third embodiment of the present invention. The CPU 11 of the word search system 1 acquires the coordinate data of the handwriting of the handwritten character written by a pen type tablet, a stylus pen, or the like (Step S2401). The CPU 11, based on the acquired coordinate data of the handwriting of the handwritten character, references to the character recognition dictionary 122 to extract a series of recognition candidate character strings (Step S2402).

The CPU 11 compares the recognition candidate character for every character with the word to be the search target to thereby acquire a matched word from the words dictionary 121 as the search result (Step S2403), and counts the number of extracted words (Step S2404). The CPU 11 determines whether or not the number of counted words is larger than a predetermined value, for example, "10" (Step S2405).

If the CPU 11 determines that the number of counted words is not larger then the predetermined value (Step S2405: NO), the CPU 11 determines that it is not necessary to particularly generate the parts of character strings to reduce the search words, and executes the normal word search procedure. If the CPU 11 determines that the number of counted words is larger than the predetermined value (Step S2405: YES), the CPU 11 moves the process to Step S804 of the first embodiment, or Step S1404 of the second embodiment to execute the aforementioned procedure.

As described above, according to the present third embodiment, the part of character string can be generated only when the selection processing by the user reaches a number which is hard to be processed, for example, when the number of words to be outputted as the search result exceeds the number of words which can be displayed on the screen, or the like, so that data-processing load may not be increased upon normal word search, thereby making it possible to prevent deterioration of a search response in advance.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A word search apparatus comprising:
a words dictionary for storing a plurality of entries of character strings;
a character recognition dictionary for storing coordinate data of a standard character pattern of a character and a character corresponding to said coordinate data;
a character input device for receiving an input of a plurality of coordinate data of input characters;
means for performing a pattern matching between the received coordinate data of input characters and said character recognition dictionary;
means for performing character recognition on each input character, and extracting a plurality of candidate characters for each input character;
means for forming a plurality of candidate strings by combining one of said plurality of candidate characters for each input character;
means for searching, in said words dictionary, for entries containing at least one of said plurality of candidate strings;
means for extracting the candidate strings contained in the entries found in said searching;
means for displaying at least one of the character strings found in said searching in a search result display area;
means for displaying, in a partial character string display area, only the extractred character strings;
means for receiving a selection of one of said extracted character strings;
means for extracting words containing the selected candidate string from the entries found in said searching; and
means for displaying only the extracted words in the search result display area.

2. The word search apparatus according to claim 1, comprising:
means for counting the number of entries found in said searching; and
means for determining whether or not said number of counted entries is larger than a predetermined value, wherein
only when said means for determining determines that the number of counted entries is larger than the predetermined value, candidate strings are extracted by said means for extracting the candidate strings, while when said means for determining determines that the number of counted entries is not larger than the predetermined value, a selection from the entries found in said searching is received.

3. A word search apparatus comprising:
a words dictionary for storing a plurality of entries of character strings;
a character recognition dictionary for storing coordinate data of a standard character pattern of a character and a character corresponding to said coordinate data;
a character input device for receiving an input of a plurality of coordinate data of input characters;
means for performing a pattern matching between the received coordinate data of input characters and said character recognition dictionary;
means for performing character recognition on each input character, and extracting a plurality of candidate characters for each input character;
means for forming a plurality of candidate strings by combining one of said plurality of candidate characters for each input character;
means for searching, in said words dictionary, for entries containing at least one of said plurality of character strings;
means for extracting the candidate strings contained in the entries found in said searching;
means for displaying, in a partial character string display area, one of said extracted candidate strings and the candidate characters not present in said displayed candidate string for at least one of the characters in said displayed candidate string;
means for receiving a selection of one candidate character among the candidate characters;
means for reconstructing at least one candidate character string based on the selected candidate character and displaying at least the reconstructed candidate string in the partial character string display area;

means for extracting words containing the reconstructed candidate string from the entries found said searching; and means for displaying the extracted words in a search result display area.

4. The word search apparatus according to claim 3, comprising:

means for counting the number of entries found in said searching; and means for determining whether or not said number of counted entries is larger than a predetermined value, wherein only when said means for determining determines that the number of counted entries is larger than the predetermined value, candidate strings are extracted by said means for extracting the candidate strings, while when said means for determining determines that the number of counted entries is not larger than the predetermined value, a selection from the entries found in said searching is received.

5. A word search apparatus comprising:

a words dictionary for storing a plurality of entries of character strings;

a character recognition dictionary for storing coordinate data of a standard character pattern of a character and a character corresponding to said coordinate data; and a character input device for receiving an input of a plurality of coordinate data of input characters; and a processor which performs the steps of performing a pattern matching between the received coordinate data of input characters and said character recognition dictionary;

performing character recognition on each input character, and extracting a plurality of candidate characters for each input character;

forming a plurality of candidate strings by combining one of said plurality of candidate characters for each input character;

searching, in said words dictionary, for entries containing at least one of said plurality of candidate strings;

extracting the candidate strings contained in the entries found in said searching;

displaying at least one of the character strings found in said searching in a search result display area;

displaying, in a partial character string display area, only the extracted character strings;

receiving a selection of one of said extracted character strings; and extracting words containing the selected candidate string from the entries found in said searching; and displaying only the extracted words in the search result display area.

6. The word search apparatus according to claim 5, wherein said processor further performs the steps of:

counting the number of entries found in said searching; and determining whether or not said number of counted entries is larger than a predetermined value, wherein only when it is determined that the number of counted entries is larger than the predetermined value, said candidate strings are extracted, while when it is determined that the number of counted entries is not larger than the predetermined value, a selection from the entries found in said searching is received.

7. A word search apparatus comprising:

a words dictionary for storing a plurality of entries of character strings;

a character recognition dictionary for storing coordinate data of a standard character pattern of a character and a character corresponding to said coordinate data; and a character input device for receiving an input of a plurality of coordinate data of input characters; and a processor which performs the steps of:

performing a pattern matching between the received coordinate data of input characters and said character recognition dictionary;

performing character recognition on each input character, and extracting a plurality of candidate characters for each input character;

forming a plurality of candidate strings by combining one of said plurality of candidate characters for each input character;

searching, in said words dictionary, for entries containing at least one of said plurality of character strings;

extracting the candidate strings contained in the entries found in said searching;

displaying, in a partial character string display area, one of said extracted candidate strings and the candidate characters not present in said displayed candidate string for at least one of the characters in said displayed candidate string;

receiving a selection of one candidate character among the candidate characters;

reconstructing at least one candidate character string based on the selected candidate character and displaying at least the reconstructed candidate string in the partial character string display area;

extracting words containing the reconstructed candidate string from the entries found in said searching; and displaying the extracted words in a search result display area.

8. The word search apparatus according to claim 7, wherein said processor further performs the steps of:

counting the number of entries found in said searching; and determining whether or not said number of counted entries is larger than a predetermined value, wherein only when it is determined that the number of counted entries is larger than the predetermined value, said candidate strings are extracted, while when it is determined that the number of counted entries is not larger than the predetermined value, a selection from the entries found in said searching is received.

9. A word search method, comprising:

using a words dictionary for storing a plurality of entries of character strings;

using a character recognition dictionary for storing coordinate data of a standard character pattern of a character and a character corresponding to said coordinate data;

receiving an input of a plurality of coordinate data of input characters;

performing a pattern matching between the received coordinate data of input characters and said character recognition dictionary;

performing character recognition on each input character, and extracting a plurality of candidate characters for each input character;

forming a plurality of candidate strings by combining one of said plurality of candidate characters for each input character;

searching, in said words dictionary, for entries containing at least one of said plurality of candidate strings;

extracting the candidate strings contained in the entries found in said searching;

displaying at least one of the character strings found in said searching in a search result display area;

displaying, in a partial character string display area, only the extracted candidate strings;

receiving a selection of one of said extracted character strings;

extracting words containing the selected candidate string from the entries found in said searching; and displaying only the extracted words in the search result display area.

10. The word search method according to claim 9, further comprising the steps of:

counting the number of entries found in said searching;

determining whether or not said number of counted entries is larger than a predetermined value; and only when it is determined that the number of counted entries is larger than the predetermined value, said candidate strings are extracted, while when it is determined that the number of counted entries is not larger than the predetermined value, a selection from the entries found in said searching is received.

11. A word search method, comprising:

receiving an input of a plurality of coordinate data of input characters;

performing a pattern matching between the received coordinate data of input characters and a character recognition dictionary for storing coordinate data of a standard character pattern of a character and a character corresponding to said coordinate data;

performing character recognition on each input character, and extracting a plurality of candidate characters for each input character;

forming a plurality of candidate strings by combining one of said plurality of candidate characters for each input character;

searching, in a words dictionary storing a plurality of entries of character strings, for entries containing at least one of said plurality of candidate strings;

extracting the candidate strings contained in the entries found in said searching;

displaying, in a partial character string display area, one of said extracted candidate strings and the candidate characters not present in said displayed candidate string for at least one of the characters in said displayed candidate string;

receiving a selection of one candidate character among the candidate characters displayed in the partial character string display area;

reconstructing at least one candidate character string based on the selected candidate character and displaying at least the reconstructed candidate string in the partial character string display area;

extracting words containing the reconstructed candidate string from the entries found in said searching and displaying the extracted words in a search result display area.

12. The word search method according to claim 11, further comprising the steps of:

counting the number of entries found in said searching;

determining whether or not said number of counted entries is larger than a predetermined value; and only when it is determined that the number of counted entries is larger than the predetermined value, said candidate strings are extracted, while when it is determined that the number of counted entries is not larger than the predetermined value, a selection from the entries found in said searching is received.

13. A non-transitory storing medium storing a computer program product comprising instructions which, when executed by a computer, cause the computer to:

use a words dictionary for storing a plurality of entries of character strings;

use a character recognition dictionary for storing coordinate data of a standard character pattern of a character and a character corresponding to said coordinate data, receive an input of a plurality of coordinate data of input characters, perform a pattern matching between the received coordinate data of input characters and said character recognition dictionary;

perform character recognition on each input character, and extracting a plurality of candidate characters for each input character;

form a plurality of candidate strings by combining one of said plurality of candidate characters for each input character;

search, in said words dictionary, for entries containing at least one of said plurality of candidate strings;

extract the candidate strings contained in the entries found in said search;

display at least one of the character strings found in said search in a search result display area;

display, in a partial character string display area, only the extracted candidate strings;

receive a selection of said extracted character strings;

extract words containing the selected candidate string from the entries found in said search; and display only the extracted words in the search result display area.

14. The non-transitory storing medium storing the computer program product according to claim 13, further comprising instructions which, when executed by said computer, cause the computer to:

count the number of entries found in said search;

determine whether or not said number of counted entries is larger than a predetermined value; and only when it is determined that the number of counted entries is larger than the predetermined value, said candidate strings are extracted, while when it is determined that the number of counted entries is not larger than the predetermined value, a selection from the entries found in said search is received.

15. A non-transitory storing medium storing a computer program product comprising instructions which, when executed by a computer, cause the computer to:

use a words dictionary for storing a plurality of entries of character strings;

use a character recognition dictionary for storing coordinate data of a standard character pattern of a character and a character corresponding to said coordinate data;

receive an input of a plurality of coordinate data of input characters;

perform a pattern matching between the received coordinate data of input characters and said character recognition dictionary;

perform character recognition on each input character, and extracting a plurality of candidate characters for each input character;

form a plurality of candidate strings by combining one of said plurality of candidate characters for each input character;

search, in said words dictionary, for entries containing at least one of said plurality of candidate strings;

extract the candidate strings contained in the entries found in said searching;

display, in a partial character string display area, one of said extracted candidate strings and the candidate characters not present in said displayed candidate string for at least one of the characters in said displayed candidate string;

receive a selection of one candidate character among the candidate characters displayed in the partial character string display area;

reconstruct at least one candidate character string based on the selected candidate character and displaying at least the reconstructed candidate string in the partial character string display area;

extract words containing the reconstructed candidate string from the entries found in said searching; and display the extracted words in a search result display area.

16. The non-transitory storing medium storing the computer program product according to claim 15, further comprising instructions which, when executed by said computer, cause the computer to:

count the number of entries found in said search;

determine whether or not said number of counted entries is larger than a predetermined value; and only when it is determined that the number of counted entries is larger than the predetermined value, said candidate strings are extracted, while when it is determined that the number of counted entries is not larger than the predetermined value, a selection from the entries found in said search is received.

* * * * *